US008498724B2

(12) United States Patent
Aoki et al.

(10) Patent No.: US 8,498,724 B2
(45) Date of Patent: Jul. 30, 2013

(54) DIGITAL MIXER

(75) Inventors: Takamitsu Aoki, Hamamatsu (JP); Masaaki Okabayashi, Hamamatsu (JP); Kotaro Terada, Hamamatsu (JP)

(73) Assignee: Yamaha Corporation (JP)

( * ) Notice: Subject to any disclaimer, the term of this patent is extended or adjusted under 35 U.S.C. 154(b) by 1294 days.

(21) Appl. No.: 12/044,562

(22) Filed: Mar. 7, 2008

(65) Prior Publication Data

US 2008/0219478 A1 Sep. 11, 2008

(30) Foreign Application Priority Data

Mar. 9, 2007 (JP) ................................ 2007-060956
Mar. 9, 2007 (JP) ................................ 2007-060974
Mar. 9, 2007 (JP) ................................ 2007-060976
Mar. 9, 2007 (JP) ................................ 2007-060985

(51) Int. Cl.
*G06F 17/00* (2006.01)

(52) U.S. Cl.
USPC ........................................................ 700/94

(58) Field of Classification Search
USPC .... 700/94; 369/1–12; 704/500–504; 381/119
See application file for complete search history.

(56) References Cited

U.S. PATENT DOCUMENTS 7,433,745 B2 10/2008 Aoki et al.
7,499,558 B2 3/2009 Holton
2004/0159218 A1 * 8/2004 Aiso et al. ........................ 84/625

FOREIGN PATENT DOCUMENTS

JP 2004-064483 A 2/2004
JP 2004-064484 A 2/2004
JP 2005-086485 A 3/2005
JP 2005-086802 A 3/2005
JP 2005-204052 A 7/2005
JP 2005-274822 A 10/2005
JP 2005-328372 A 11/2005
JP 2006-173687 A 6/2006
JP 2007-043249 A 2/2007

OTHER PUBLICATIONS

Yamaha; PM5D Digital Mixing Console, PM5D/PM5D-RF, Owner's Manual; pp. 1-362 not including diagrams. Cited in specification.
Notification of Reason for Refusal issued in Japanese Patent Application 2007-060985 dated Nov. 15, 2011.
JP Office Action issued Nov. 6, 2012 for corresponding JP2007-060976 (English Translation Provided).
Notification of Refusal issued in Japanese Patent Application 2007-060956 dated Feb. 14, 2012.
Notification of Refusal issued in Japanese Patent Application 2007-060976 dated Feb. 21, 2012.

* cited by examiner

*Primary Examiner* — Andrew C Flanders
(74) *Attorney, Agent, or Firm* — Rossi, Kimms & McDowell LLP

(57) ABSTRACT

In a digital mixer that processes audio signals in a plurality of channels, layer data which indicates a channel to be assigned to each channel strip in a channel strip section can be set to indicate retainment of assignment status for any of the channel strips. When the layer is selected, the digital mixer assigns the channel indicated by the layer data corresponding to the selected layer to each channel strip for which assignment of some channel is indicated, and leaves the assignment of the channel unchanged regarding the channel strip for which retainment of assignment status is indicated in the layer data.

13 Claims, 18 Drawing Sheets

| LINE ID | OUTPUT CH LINK | MIXER #1 | | MIXER #2 | | MIXER #3 | |
|---|---|---|---|---|---|---|---|
| | | BUS | CASCADE LINK | BUS | CASCADE LINK | BUS | CASCADE LINK |
| MX 1 | ON | MIX 5 | ON | MIX 3 | ON | MIX 1 | ON |
| MX 2 | ON | MIX 4 | ON | MIX 2 | OFF | MIX 2 | ON |
| MX 3 | OFF | MIX 3 | ON | MIX 1 | ON | MIX 3 | OFF |
| ⋮ | ⋮ | ⋮ | ⋮ | ⋮ | ⋮ | ⋮ | ⋮ |
| MX24 | ... | ... | ... | ... | ... | ... | ... |

DIGITAL MIXER

BACKGROUND OF THE INVENTION

1. Field of the Invention

The invention relates to a digital mixer that processes audio signals in a plurality of channels based on values of parameters of each of the channels stored in a current memory.

2. Description of the Related Art

Conventionally, a digital mixer described in, for example in Document 1, is known as a digital mixer that processes audio signals in a plurality of channels based on values of parameters of each of the channels stored in a current memory.

Document 1: PM5D/PM5D-RH Operation Manual, YAMAHA Corporation, 2004, p. 72-74, 135-136

In this digital mixer, an input channel strip section includes twenty-four channel strips. A layer for assigning 1st to 24th input channels to the respective channel strips and a layer for assigning 25th to 48th input channels to the respective channel strips are provided. This allows to switch correspondence relations between channel strips and input channels in response to a layer selection. With such a structure, in the digital mixer, values of parameters of forty-eight input channels can be edited using the twenty-four channel strips.

Further, desired channels are assigned to other eight faders, which are provided separately from the input channel strip section, and the faders can be used to edit fader parameter values of the assigned channels. Further, an assignment pattern for assigning a desired channel to each of eight faders is prepared as a layer, and a plurality of layers can be registered. A user can reflect the assignment pattern of the layers to the eight faders by selecting a layer.

With such an operation, the user can edit the parameters of the channels assigned to the faders as switching the channel assignments to the fader by selecting layers with a simple operation, even when a number of the channels to be assigned to the fader is greater than the number of the faders.

Further, the digital mixer described in the Document 1 is a digital mixer capable of sharing mixing buses when cascaded with other digital mixers. Such a digital mixer capable of sharing mixing buses is also described in the Document 2.

Document 2: Japanese Patent Laid-Open Publication No. 2005-274822

Each of the digital mixers has a function for processing an audio signal, which is mixed in a mixing bus, in an output channel corresponding to the mixing bus and outputting the signal, and a function for supplying an audio signal, witch is mixed in the mixing bus, to some mixing bus in a downstream digital mixer in the cascade connection, according to a predetermined correspondence relation, for the mixing in the mixing bus.

With these functions, the downstream digital mixer can mix the audio signals supplied from its own input channels to the mixing bus and the audio signals supplied from upstream digital mixer to the mixing bus. Accordingly, the downstream digital mixer can practically mix not only audio signals inputted from its own input channels but also audio signals inputted from input channels of the upstream digital mixer, and output the mixed signal.

The Document 1 also describes a configuration, in which two digital mixers are connected using terminals for a cascade connection so as to transmit and receive audio signals in two way communications so that both of the two digital mixers can mix audio signals inputted from both digital mixers and output the mixed signal. With such a configuration, outputs can be obtained from the respective output channels as if the corresponding mixing buses between the two digital mixers are connected as a common mixing bus to perform mixing.

The Documents 1 and 2 also describe functions for linking storing or recalling scenes, ON/OFF and level setting of DCA groups, parameters such as mute ON/OFF setting in mute groups, between the cascaded digital mixers, and when the linked settings or values of the linked parameters are changed in one digital mixer, providing corresponding changes to other digital mixer.

SUMMARY OF THE INVENTION

On the other hand, according to such a conventional digital mixer described in the Document 1, the assignment patterns defined by the layers are only assignment patterns for assigning one specific channel to a fader. Accordingly, when the layer is switched, channels are assigned to all of the faders according to the content of the newly selected layer. It is not allowed to modify the assignment pattern for a part of the faders and keep other faders in the assignment pattern according to the layer selected before switching.

In this regard, there has been a problem of low flexibility in channel assignment to faders by using layers.

This problem occurs not only in the case of assigning channels to faders but also in a case of assigning channels to any kind of controls or control groups.

The invention has an object to solve the above problem and improve flexibility in channel assignment of a digital mixer that processes audio signals in a plurality of channels when the channel assignment to controls are executed by using layers.

Further, according to the above described digital mixer, layer selection for assigning input channels to input channel strip and layer selection for assigning channels to other faders are independently executed.

However, even if the layers are for assignment to different targets, such layers are often selected at the same time when assignment patterns of the layers are related to each other, for example. When such an operation is executed, there has been a problem that the operation is complicated since a layer selection operation is required for every range (kind) of the layers.

This problem can occur when channels are assigned to any types of controls or control groups. The same problem can also occur when the layer is not used to define the assignment pattern, for example, when a device to be operated is assigned to a control.

The invention has another object to solve the problems and to improve the operability of assigning operation when operating target is assigned to controls of plural sections for each of the sections.

Furthermore, according to the above descried digital mixer, only channels of the digital mixer itself can be assigned to faders by using layers. This is because the digital mixer is configured to store parameters used in its own signal processing to the respective digital mixers and accept editing operations of parameters used in its own signal processing via controls provided thereof, even in a case that plural digital mixers are cascaded, as described in the Document 1.

However, when plural digital mixers are cascaded, generally, those digital mixers are made work together to function as a large digital mixer. In such a case, it is preferable, in view of operability and space saving, that a control is provided to one of the digital mixers and parameter values of other digital mixers are edited using the control. With such a structure, users do not have to move around the plural mixers to provide settings. Also, since it is possible to provide a configuration such that one digital mixer having a parameter adjusting control is cascaded with other digital mixers which do not have the parameter adjusting control, the entire system can be downsized, compared to a case of providing a large operation panel to every mixer.

However, according to a conventional digital mixer, since only channels of own device can be assigned to the faders by using layers, channel assignment using layers cannot be used when editing values of parameters of other digital mixers. Thus, there has been a problem that sufficient operability cannot be obtained.

This problem occurs not only in the case of assigning channels to faders but also in a case of assigning channels to any types of controls or control groups.

The invention has still another object to solve this problem and improve operability when parameter values in plural cascaded digital mixers are edited in use of a control provided to one of the digital mixers.

Furthermore, according to the above described digital mixers of the Document 1 and 2, when parameters are linked, connecting relation of mixing buses between cascaded mixers are not particularly considered.

However, regarding some particular type of parameters, destinations to be linked with the values cannot simply be determined when the connecting relation between the mixing buses is variable, in other words, when the target mixing bus to which audio signals mixed in each mixing bus is variable in each digital mixer. As a result, it has been a problem that linking of parameters cannot be executed properly when the connecting relation between the mixing buses is variable.

For example, it is assumed that the same IDs (for example, 1 to 32) are given to the mixing buses and output channels for outputting the signals mixed in corresponding mixing buses. In this case, the mixing bus whose ID is 1 corresponds to the output channel whose ID is 1 within a digital mixer. Further, if considered simply, between digital mixers of the same model, mixing buses having the same IDs are considered to be in correspondence relation, and output channels having the same IDs are also considered to be in correspondence relation. It can also be considered that parameters of the mixing buses having the same IDs are to be matched, and that parameters of output channels having the same IDs are also to be matched when parameters are linked in plural digital mixers.

On the other hand, when audio signals mixed in a mixing bus whose ID is 1 in a digital mixer A and audio signals mixed in a mixing bus whose ID is 2 in a digital mixer B are further mixed utilizing a cascade connection to output, these mixing buses are preferably handled as buses in correspondence relation even when those buses have different IDs. When parameters of output channels are linked, it is preferable to link values of parameters of output channels which output signals of those corresponding mixing buses, that is, an output channel whose ID is 1 in the digital mixer A and an output channel whose ID is 2 in the digital mixer B.

However, a method for linking parameters properly in view of the above situation has been unknown.

It has been a problem that operation is bothersome since settings have to be provided separately to each of the digital mixers when, as in the later example, values of parameters are matched between signal processing elements having different IDs.

The invention has still another object to solve the problem and to realize a mixer system composed of plural cascaded digital mixers, in which corresponding parameters of the respective digital mixers can be maintained to be same values even when the correspondence relation of mixing buses or output channels of the digital mixers is variable.

To attain the above described object, the invention provides a digital mixer that processes audio signals in a plurality of channels based on values of parameters of each of the channels stored in a first current memory, including: a first channel strip section including a plurality of first channel strips, on each of which a plurality of controls are disposed; a first parameter editor that edits, in response to operation of each of the controls on each of the first channel strips by a user, a value of a parameter, corresponding to the operated control, among parameters of a channel assigned to the first channel strip having the operated control; a first layer memory that stores first layer data for each of a plurality of first layers, respective first layer data indicating, for each of the first channel strips, any of (a) one channel to be assigned to the first channel strip among the plurality of channels, and (b) retainment of channel assignment to the first channel strip; and a first assigning device that, in response to a selection of one of the plurality of first layers by the user, selects first layer data corresponding to the selected first layer, for each of the first channel strips, if the selected first layer data indicate a channel, assigns the channel indicated by the selected first layer data to the first channel strip, and, if the selected first layer data indicate the retainment, leaves the assignment of a channel to the first channel strip unchanged.

In such a digital mixer, it is preferable that the respective first layer data indicate, for each of the first channel strips, any of (a) one channel among the plurality of channels, (b) retainment of channel assignment to the first channel strip, and (c) no-assignment of channel to the first channel strip, the first assigning device, for each of the first channel strips, if the selected first layer data indicate no-assignment, changes the first channel strip into a non-assigned state in which no channels are assigned to the first channel strip, and the first parameter editor does not perform the edit of the value of the parameter in response to the operation of the controls, if the channel assigned to the first channel strip having the operated control is in the non-assigned state.

It is also preferable that the digital mixer further includes: a second channel strip section including a plurality of second channel strips, on each of which a plurality of controls are disposed; a second layer memory that stores second layer data for each of a plurality of second layers, respective second layer data indicating, for each of the second channel strips, one channel to be assigned to the second channel strip among the plurality of channels; a second assigning device that, in response to a selection of one of the plurality of second layers by the user, selects second layer data corresponding to the selected second layer, and assigns the channel indicated by the selected second layer data to each of the second channel strips; and a second parameter editor that edits, in response to operation of each of the controls on each of the second channel strips by a user, a value of a parameter, corresponding to the operated control, among parameters of a channel assigned to the second channel strip having the operated control, wherein the respective first layer data include first link data that indicate one of the plurality of the second layers, and the first assigning device controls, when selecting the first layer data in response to the selection of the one first layer by the user, the second assigning device to select the second layer data corresponding to the second layer indicated by the first link data included in the selected first layer data.

It is further preferable that the first link data included in the respective first layer data indicate any of (a) one of the plurality of second layers, and (b) retainment of selection of the second layer, and the first assigning device does not control, even when selecting the first layer data in response to the selection of the one first layer by the user, the second assigning device to select the second layer data, if the first link data included in the selected first layer data indicate the retainment.

Alternatively, it is also preferable that the digital mixer further includes: a cascade interface for cascading another digital mixer that processes audio signals in a plurality of channels; and a mixer selector that selects a target mixer in which parameters are to be edited according to operation of the controls of the second channel strips, among the digital mixer and a cascaded mixer which is cascaded to the cascade interface, wherein the second parameter editor edits, in response to operation of each of the controls on each of the second channel strips by a user, a value of a parameter, corresponding to the operated control, among parameters of a channel assigned to the second channel strip having the operated control by the second assigning device according to the second layer data, in the target mixer selected by the mixer selector, the respective first layer data include second link data that indicate the target mixer to be selected by the mixer selector, and the first assigning device controls, when selecting the first layer data in response to the selection of the one first layer by the user, the mixer selector to select the target mixer indicated by the second link data included in the selected first layer data.

In the above described digital mixer, it is also preferable that the digital mixer further includes a cascade interface for cascading another digital mixer that processes audio signals in a plurality of channels based on values of parameters of each of the channels stored in a second current memory provided in the another mixer, wherein the respective first layer data indicate, for each of the first channel strips, any of (a) one channel to be assigned to the first channel strip among the plurality of channels in the digital mixer, (b) retainment of channel assignment to the first channel strip, and (c) one channel to be assigned to the first channel strip among the plurality of channels in a cascaded mixer which is cascaded to the cascade interface, the first assigning device, when selecting the first layer data, for each of the first channel strips, if the selected first layer data indicate a channel in the digital mixer or a channel in the cascaded mixer, assigns the channel indicated by the selected first layer data to the first channel strip, and, if the selected first layer data indicate the retainment, leaves the assignment of a channel to the first channel strip unchanged, and the first parameter editor, in response to operation of each of the controls on each of the first channel strips by a user, edits a value of a parameter stored in the first current memory, corresponding to the operated control, among parameters of a channel assigned to the first channel strip having the operated control, if any of the channels in the digital mixer is assigned to the first channel strip, and requests the cascaded mixer to edit a value of a parameter stored in the second current memory, corresponding to the operated control, among parameters of a channel assigned to the first channel strip having the operated control, if any of the channels in the cascaded mixer is assigned to the first channel strip.

It is also preferable that the digital mixer further includes: a cascade interface for cascading another digital mixer that processes audio signals in a plurality of channels based on values of parameters of each of the channels stored in a second current memory provided in the another mixer; a third current memory which corresponds to the second current memory provided in a cascaded mixer which is cascaded to the cascade interface; and a synchronizing device that synchronizes data stored in the second current memory with data stored in the third current memory, wherein the respective first layer data indicate, for each of the first channel strips, any of (a) one channel to be assigned to the first channel strip among the plurality of channels in the digital mixer, (b) retainment of channel assignment to the first channel strip, and (c) one channel to be assigned to the first channel strip among the plurality of channels in a cascaded mixer which is cascaded to the cascade interface, the first assigning device, when selecting the first layer data, for each of the first channel strips, if the selected first layer data indicate a channel in the digital mixer or a channel in the cascaded mixer, assigns the channel indicated by the selected first layer data to the first channel strip, and, if the selected first layer data indicate the retainment, leaves the assignment of a channel to the first channel strip unchanged, the first parameter editor, in response to operation of each of the controls on each of the first channel strips by a user, edits a value of a parameter stored in the first current memory, corresponding to the operated control, among parameters of a channel assigned to the first channel strip having the operated control, if any of the channels in the digital mixer is assigned to the first channel strip, and edits a value of a parameter stored in the third current memory, corresponding to the operated control, among parameters of a channel assigned to the first channel strip having the operated control, if any of the channels in the cascaded mixer is assigned to the first channel strip, and the synchronizing device requests, when the value of the parameter stored in the third current memory is edited, the cascaded mixer to reflect the edited value to a value of the parameter stored in the second current memory.

In the above described digital mixer, it is also preferable that the digital mixer further includes: a plurality of first busses each of which mixes audio signals processed in the channels; a correspondence setting device that sets one by one correspondence relation between the plurality of first busses and a plurality of lines which are provided for signal transmission between the digital mixer and the cascaded mixer; a cascade mixing device that receives, via the plurality of lines, audio signals mixed in a plurality of second busses provided in the cascaded mixer, and mixes the audio signal received via each of the plurality of lines with the audio signal in the first bus which is corresponded to the line; and a cascade output device that supplies the audio signal of each of the plurality of lines mixed by the cascade mixing device for one of a plurality of output channels which is corresponded to the line, wherein the digital mixer processes audio signals in the plurality of output channels based on values of parameters of each of the output channels stored in the first current memory.

It is further preferable that the digital mixer further includes: a link setting device that sets link ON/OFF for each of the plurality of lines; and a linking device that synchronizes values of the parameters among the output channels for which the audio signals are supplied from a common line, for each of the plurality of lines for which the link ON is set.

It is further preferable that the link ON can be collectively set for two or more lines, and the lining device synchronizes values of the parameters among the output channels for which the audio signals are supplied from any of the lines for which the link ON is collectively set.

Alternatively, it is also preferable that whether the audio signal in the first bus is to be provided for the mixing in the cascade mixing or not can be set for each of the plurality of the first busses, and the cascade output device does not supply the audio signals mixed by the cascade mixing device for the output channel which is corresponded to the first bus for which the not to be supplied is set.

The above and other objects, features and advantages of the invention will be apparent from the following detailed description which is to be read in conjunction with the accompanying drawings.

DETAILED DESCRIPTION OF THE PREFERRED EMBODIMENTS

A preferred embodiment of the invention will be described in detail with reference to the drawings.

A configuration of a mixer system including a digital mixer of an embodiment of the invention will be described.

Figure 1:
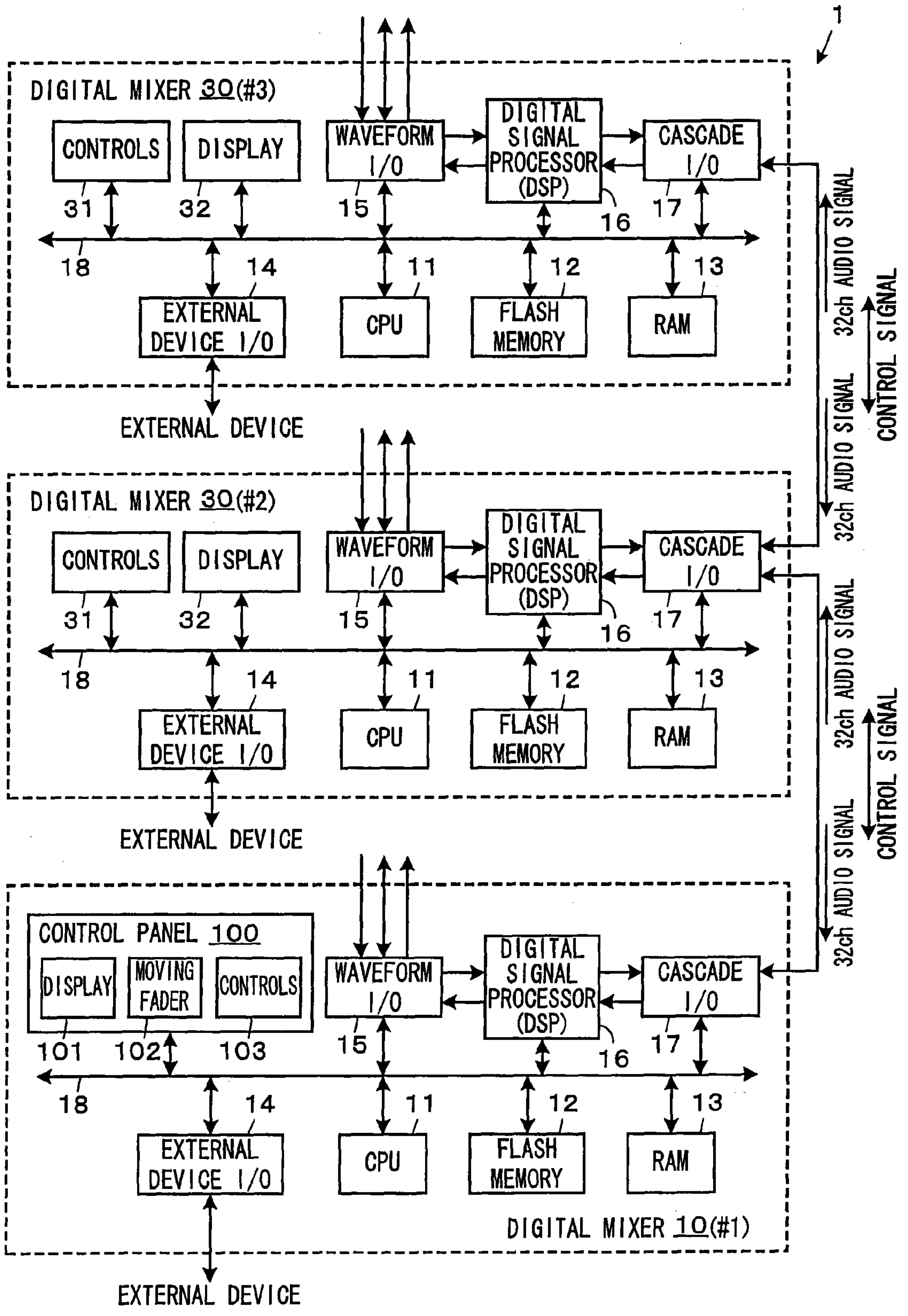
FIG. 1 is a block diagram showing a configuration of a mixer system including a digital mixer of an embodiment of the invention.

FIG. 1 is a block diagram showing a configuration of the mixer system.

As shown in FIG. 1, the mixer system 1 is composed of connected three digital mixers. One of the digital mixers is a digital mixer 10 having an operation panel 100 and the other two digital mixers are digital mixers 30 having no operation panel. Each of the digital mixers 10, 30 includes a signal processing function sufficient to operate as a digital mixer by itself; however, when connected to form the mixer system 1, the digital mixers 10, 30 can work together and execute signal processing in cooperation with each other in a larger scale compared to working as independent digital mixers.

The configuration of the digital mixer 10 will be firstly explained.

As shown in FIG. 1, the digital mixer 10 includes a CPU 11, a flash memory 12, a RAM 13, an external device input/output module (I/O) 14, a waveform I/O 15, a digital signal processor (DSP) 16, cascade I/O 17 and the operation panel 100. These components are connected via a system bus 18. The digital mixer 10 also has a function for executing various signal processing on audio signals, which are inputted from plural input ports, in signal processing elements such as plural input channels, and outputting the processed signals.

The CPU 11 is a controller for centrally controlling operations of the digital mixer 10. The CPU 11 executes required control programs stored in the flash memory 12 to control communications via the external device I/O 14, waveform I/O 15 and cascade I/O 17, detect operations on the operation panel 100, control display of the operation panel 100, set and change parameter values used in signal processing in the DSP 16, for example.

The flash memory 12 is a rewritable nonvolatile memory for storing control programs and the like executed by the CPU 11.

The RAM 13 is a memory for storing temporarily-stored data and being used as a work memory of the CPU 11.

The external device I/O 14 is an interface for connecting with various external devices to input and output data. The external device I/O 14 is, for example, an interface for connecting with an external display, a mouse, a keyboard for inputting characters, an operation panel and the like. Parameter settings or modifications and operation instructions can be executed in use of such external devices, so the displays and controls of the digital mixer can have simple configurations.

Further, a USB (Universal Serial Bus) type interface or an interface for performing Ethernet (registered trademark) communications and the like can be employed as an interface to communicate with a control device such as a personal computer (PC).

The waveform I/O 15 is an interface for accepting an input of audio signals, which are to be processed in the DSP 16, and outputting the processed audio signals. In the waveform I/O 15, analog input terminals having an A/D conversion circuit, analog output terminals having a D/A conversion circuit, digital input terminals for inputting digital data and digital output terminals for outputting digital data are provided accordingly in combinations. The terminals can be added using an extension board. Although it is not described in the figure, the waveform I/O 15 also includes a monitor output terminal, which is used by an operator of the digital mixer 10 to monitor signals being processed in the DSP 16.

The DSP 16 is a signal processor, which includes a signal processing circuit and performs various signal processing such as mixing and equalizing on audio signals inputted from the waveform I/O 15 according to values of the various parameters stored in a current memory to output the processed signals to the waveform I/O 15. A storage area of the current memory can be provided in memories disposed in the RAM 13 or DSP 16. Details of those signal processings will be described later.

The cascade I/O 17 is a cascade interface for transmitting and receiving audio signals and control signals to/from other digital mixers when plural digital mixers are used in a cascade connection.

The cascade I/O 17 has a terminal for connecting with an upstream digital mixer and a terminal for connecting with a downstream digital mixer. When plural digital mixers are cascaded, the connections are linear connection having a direction. Among the directly-connected devices, two-way communications can be executed for sending and receiving audio signals of plural channels (thirty-two channels in this embodiment) and control signals such as commands and responses. In order to send these signals to a device which is not directly connected, the signals are sequentially relayed by devices therebetween since the signals cannot be sent directly.

The operation panel 100 includes a display 101, a moving fader 102 and a control 103. The operation panel 100 is a user interface for accepting user's instructions related to parameter setting or mode change, and displaying an operation status and a setting content of the respective digital mixers constituting the mixer system 1, GUIs (graphical user interface) for accepting operations, and the like.

The display 101 can be composed of a liquid crystal display (LCD) or light-emitting diodes (LED), for example. The display 101 and control 103 can be made combined with each other by placing the LED behind the control element or providing a touch panel on the LCD.

The moving fader 102 is a slider control having a driver to move a knob and, with a control from the CPU 11, and the knob can be moved at a position in an operable range without user's operation.

The control 103 is a control, other than the moving fader 102, to accept user's operations and can be composed of various keys, buttons, dials, sliders and the like. Further, a touch panel can be provided on an LCD serving as a display 101.

The above is the description of the digital mixer 10.

On the other hand, compared to the digital mixer 10, the digital mixers 30 do not include the operation panel 100, but controls 31 and displays 32, which have simple configuration just for accepting basic operation such as power on or off. Their case size or positions of the terminals are accordingly different from those of the digital mixer 10; however, other parts such as the signal processing functions of the DSP 16, the number of terminals for each I/O, and processing ability of the CPU 11 are the same as those of the digital mixer 10.

In other words, in the mixer system 1, the digital mixers 30 and the digital mixer 10 are cascaded; however the digital mixers 30 are independent mixers and have an ability to accept user's operations and execute signal processing according to the operations by itself. In order to operate, an external device can be connected to the external device I/O 14 to perform remote control of the digital mixer 30 by the device. For example, the external device I/O 14 can be connected with a PC for remotely controlling the digital mixers 30 by the PC. Or, the external device I/O 14 can be connected with different types of operation panels such as a switch panel having a display or switches for recalling scenes and a fader panel having a volume control faders for several channels in order to use those operation panels to operate digital mixers 30 according to the purpose.

For this reason, it is not necessary to distinguish between the digital mixer 10 and digital mixers 30 when describing substance of signal processings. The digital mixers are thus described using reference numbers #1 to #3, which are shown in parentheses in FIG. 1, in the following description.

In the mixer system 1, values of all parameters used in signal processings of the three digital mixers can be set by operating the operation panel 100 of the digital mixer #1. Accordingly, the other two digital mixers #2, #3 are not required to include a number of controls and displays for detail operations and can include only the control element 31 and display 32, which have very simple configurations. It is thus possible to reduce device size, weight, and required cost. Here, it is preferable to match the configuration of signal processings in the DSPs 16 of all the digital mixers in view of the commonality and simplification of control programs of the digital mixer 10 and digital mixers 30 or the consistency of operations when switching digital mixers to be controlled or edited. However, the system configuration is not be limited to the above.

Figure 2:
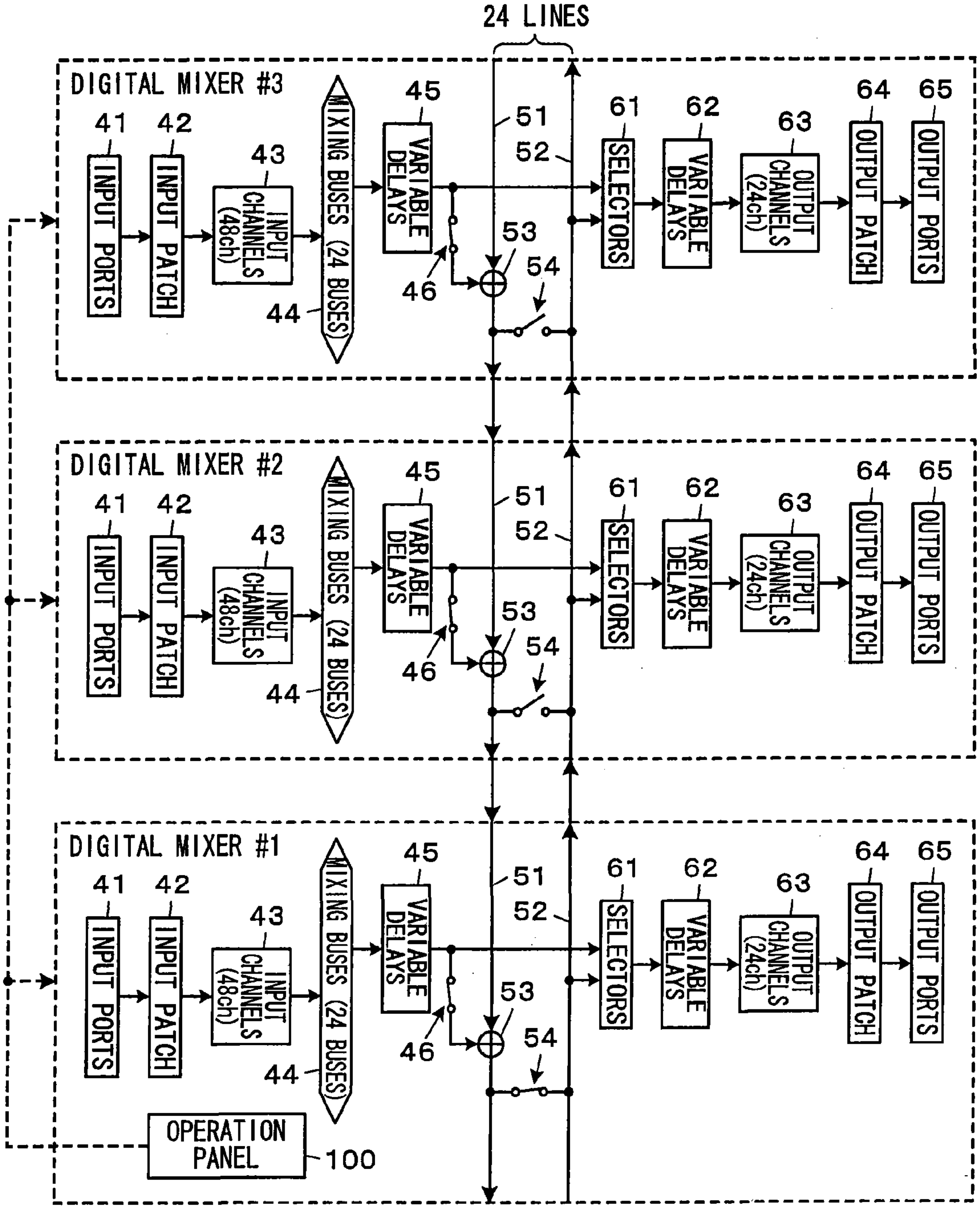
FIG. 2 is a diagram showing schematic configuration of signal processing executed by the mixer system of FIG. 1.

FIG. 2 shows a schematic configuration of signal processing executed in the mixer system 1 shown in FIG. 1.

The signal processing shown in FIG. 2 is basically realized by the DSPs 16, and data inputs and outputs are realized by the waveform I/O 15 or cascade I/O 17. Further, the arrow extending from the operation panel 100 represents that the all parameter values used in the signal processings in the three digital mixers can be controllable by the operation panel of the digital mixer #1.

As shown in FIG. 2, each of the digital mixers includes input ports 41, an input patch 42, input channels 43, mixing buses 44, variable delays 45, cascade ON switches 46, cascade buses 51, 52, adders 53, turning-back switches 54, selectors 61, variable delays 62, output channels 63, an output patch 64 and output ports 65.

The input ports 41 are ports, which are provided to the waveform I/O 15, corresponding to the audio signal input terminals, and receives audio signals supplied via cables connected to the terminals. Although there are analog input ports for receiving analog signals and digital input ports for receiving digital signals, a set of the those ports is referred to as the input ports 41 since it is not necessary to distinguish those two types.

The input patch 42 has a function of supplying the audio signals received by the input ports 41 to input channels 43 used for processing the audio signal according to correspondence relation specified by input patch data in order that the input channels 43 can process the audio signals.

The input channels 43 include forty-eight channels. Each channel of the input channels 43 have a function of processing the signals, which are inputted from the ports patched by the input patch 42, in signal processing elements such as a limiter, a compressor, an equalizer, a fader and a pan, and outputting the processed signals to each of the twenty-four mixing buses 44 after send levels of the processed signals are adjusted. In each channel of the input channels 43, it is possible to set ON/OFF of the output to each of the mixing buses 44 independently.

Each bus of the mixing buses 44 has a function of mixing the audio signals inputted from the respective input channels 43 and outputting the signals.

The variable delays 45 respectively have a function of delaying audio signals outputted from the mixing buses 44 for a predetermined time, which will be described later.

The cascade ON switches 46 are switches for setting whether signals from the corresponding mixing buses 44 are outputted to the cascade buses 51 or not, and can switch output ON/OFF settings in the respective mixing buses. When the setting is ON for some mixing bus, the corresponding adder 53 adds the audio signal outputted from the mixing bus 44 to an audio signal supplied from the upstream (upper part in the drawing) digital mixer to the corresponding cascade bus 51.

The cascade buses 51 are buses for sending the audio signals supplied from the upstream digital mixer connected via the cascade I/O 17 to the downstream digital mixer connected via the cascade I/O 17 after the adding process of the adders 53. The twenty-four lines (signal transmission paths) of cascade buses 51, 52 are provided, similarly to the mixing buses 44, and each line of the cascade buses 51 receives the audio signal from the same line of the cascade bus 51 in the upstream digital mixer. Here, it is determined based on the setting performed by a user that the audio signal outputted from which mixing bus 44 are to be added to which cascade bus 51. The uppermost stream digital mixer inputs silent signals to the cascade bus 51 as upstream signals.

The cascade buses 51 and adders 53 serve as a cascade mixing device.

On the other hand, the cascade buses 52 are buses for transmitting audio signals supplied from the downstream digital mixer to the upstream digital mixer in an opposite direction compared to the cascade buses 51. Any particular signal processing is not executed in the cascade buses 52. In each of the digital mixers, the cascade buses 52 receive audio signals supplied from the same line of the cascade buses 52 in the downstream digital mixer.

The cascade buses 52 serve as a cascade outputting device.

The turning-back switches 54 are switches for supplying the audio signals being processed in the cascade buses 51 to the cascade buses 52 of the same line. Only the turning-back switches 54 in the downmost digital mixer in the cascade connection (the digital mixer #1, in this embodiment) are turned on. The downmost digital mixer does not have a digital mixer supplying audio signals to its cascade buses 52, so that the audio signals from the cascade buses 51 are supplied to the cascade buses 52. Accordingly, in the cascade buses 52, audio signals obtained by sequentially adding audio signals outputted from the mixing buses 44 by the adders 53 from the upmost digital mixer (here, the digital mixer #3) to the downmost digital mixer are supplied, and the audio signals are sent back toward the upmost digital mixer.

The audio signals passing though the cascade buses 52 are supplied to the selectors 61.

Twenty-four units of the selectors 61 are provided corresponding to the respective mixing buses 44. Audio signals outputted from the corresponding mixing buses 44 and then delayed at the variable delays 45 are also supplied to the respective selectors 61. Here, to which selector 61 the audio signals passing through each line of the cascade buses 52 are to be supplied is determined according to correspondence relations which is opposite to the relation used when adding signals to the cascade buses 51, that is, the audio signal to which output of some mixing bus 44 is added is inputted to a selector 61 corresponding to the mixing bus. For example, when an output from a first mixing bus 44 is added to the cascade bus 51 of a third line, the audio signals in the cascade bus 52 of the third line are input to a first selector 61 corresponding to the first mixing bus 44.

Then, the respective selectors 61 work according to the state of the corresponding cascade ON switch 46. The selectors 61 select signals inputted from the cascade buses 52 when the corresponding cascade ON switch 46 is in ON-state, and select signals inputted from the mixing bus 44 via the variable delay 45 when the corresponding cascade ON switch 46 is in OFF-state. The former selection is executed when an inter-mixer mixing function using the cascade buses 51, 52 (referred to as a "cascade link") is enabled for the corresponding mixing bus 44, in order to select the mixed signals. The latter selection is executed when the cascade link is disabled, in order to select the signals outputted from the mixing bus 44 without any change.

In both cases, the audio signals selected by the selectors 61 are delayed at the variable delays 62 and then supplied to the corresponding output channels 63. The delay at the variable delays 62 is, as is the case with the variable delays 45, to adjust a transmission delay generated in a cascade link, as described below.

The output channels 63 have twenty-four channels corresponding to twenty-four mixing buses 44 and each channel of the output channels 63 has a function for processing audio signals, which are inputted from the corresponding bus, in signal processing elements such as a limiter, a compressor, an equalizer and a fader and outputting the processed audio signals to the output patch 64.

The output patch 64 has a function of supplying audio signals, which are outputted from the output channels 63, to the output ports to be used for outputting the audio signals, according to correspondence relations indicated by the output patch data.

The output ports 65 are provided to the waveform I/O 15 corresponding to the audio signal output terminals. The waveform I/O 15 outputs audio signals supplied to the output ports 65 to the cables connected to the corresponding audio signal output terminal. The outputted audio signals are used, for example, for generating sound when the connected end is a speaker and for recording when the connected end is a recorder, according to the purpose of the connected device.

The above is the description of the schematic configuration of the signal processing executed in the mixer system 1. Here, for the purpose of simplifying the explanation, the difference in functions of plural buses and channels are not considered, but buses and channels having different functions can be employed. For example, ST input channels or channels for inputting audio signals processed in an internal effector (not shown) can be provided as the input channels 43, or ST buses, AUX buses, CUE buses and the like can be provided as the mixing buses 44. Here, in this case, the variable delays 45, 62, selectors 61 and output channels 63 are also provided to correspond to each of the mixing buses. The cascade buses 51, 52 are provided to correspond to the types and numbers of the mixing buses so that the cascade buses having corresponding types can be assigned to the mixing buses one by one.

Further, the functions of each section shown in FIG. 2 can be realized as either software or hardware.

Functions of the variable delays 45, 62 will be described with reference to FIGS. 3 and 4.

Figure 3:
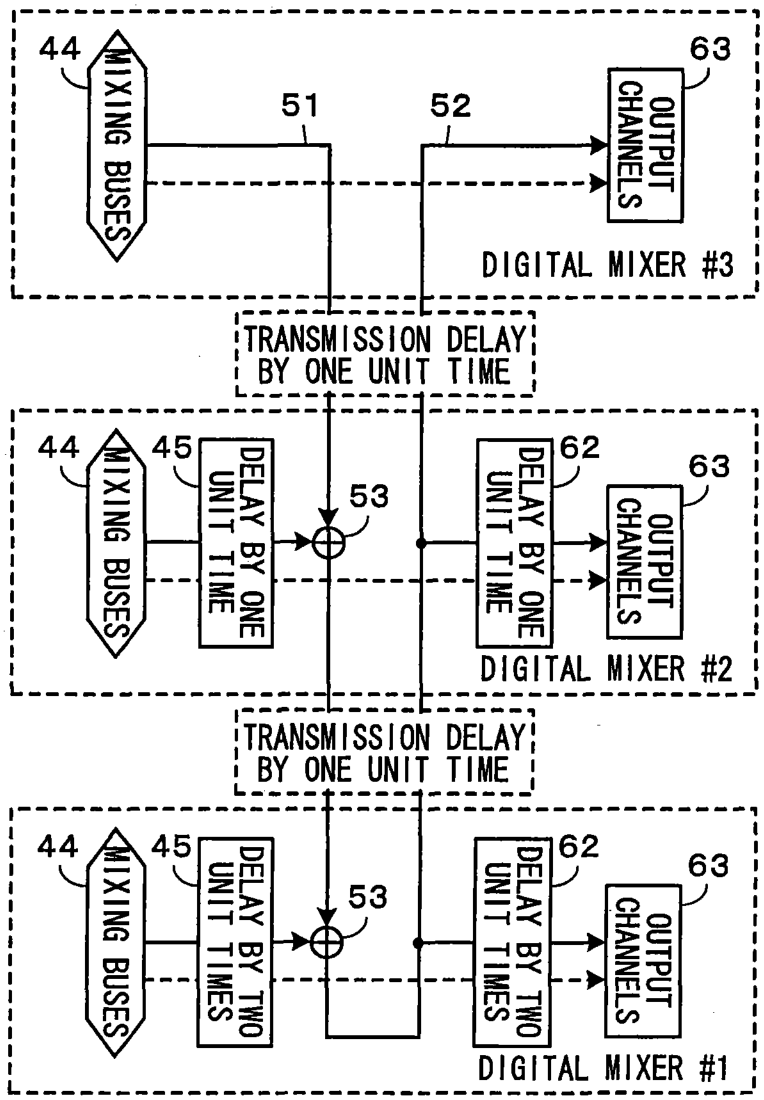
FIG. 3 is a diagram showing a flow of audio signals supplied to cascade buses shown in FIG. 2.
Figure 4:
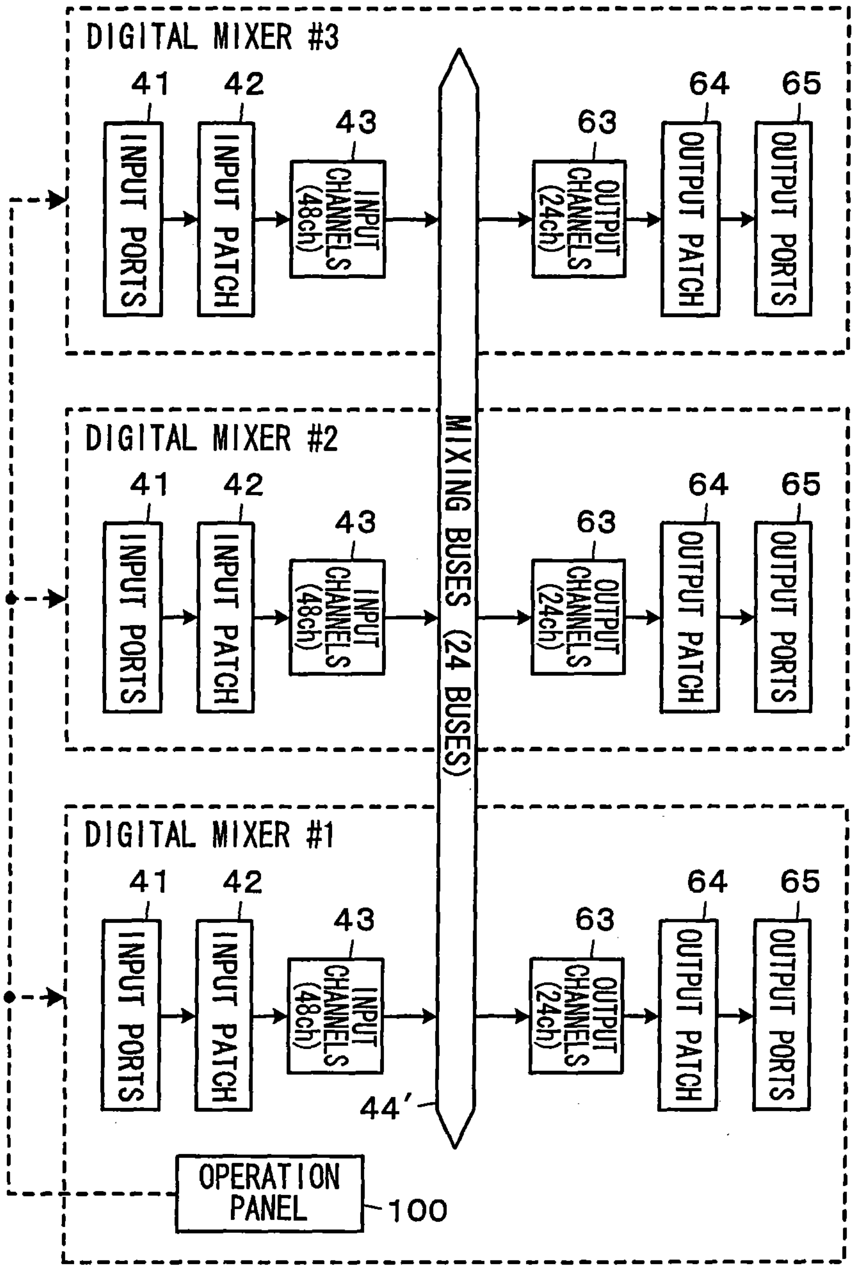
FIG. 4 is a diagram showing a function realized by a cascade link.

FIG. 3 is a diagram showing a flow of audio signals supplied to the cascade buses and FIG. 4 is a diagram showing a function realized by the cascade link.

In the mixer system 1 with the functions of each section shown in FIG. 2, audio signals mixed in the mixing buses 44 are supplied to the cascade buses 51 and audio signals supplied from the upstream mixing bus and downstream mixing bus in the cascade connection can be added in order in the cascade buses 51, as shown in FIG. 3. Then, the audio signals after the addition can be supplied from the cascade buses 52 to the output channels 63 of the respective digital mixers.

With this structure, as shown in FIG. 4, it is possible to obtain output signals as if all mixing buses of the digital mixers #1 to #3 composing the mixer system 1 are connected, and audio signals, which are processed in the input channels 43 of the respective mixers, are inputted to a common mixing bus 44' and mixed.

As shown in FIG. 3, when audio signals being processed in the cascade buses 51, 52 are transmitted between adjacent digital mixers, a predetermined transmission delay occurs. Thus, if audio signals mixed in the mixing buses 44 are simply supplied to the cascade buses 51 in each device, signals having different timing are added. Thus, the timing for adding can be adjusted by adding delay corresponding to the transmission delay occurred from the upmost digital mixer to the processing device by the variable delays 45 before supplying the signals to the cascade buses 51

Also, in case of outputting, if audio signals supplied from the cascade buses 52 are simply outputted, the audio signals having different timing due to the transmission delay are outputted. However, since the variable delays 62 add delay as much as the transmission delay which will occur during the transmission from the own device to the uppermost digital mixer to the audio signals supplied from the cascade bus 52, the timing of audio signals outputted from each digital mixer can be matched.

The audio signal mixed in one of the mixing buses 44 can be outputted to the output channels 63 without using the cascade buses, as indicated by the dotted lines. In this case, transmission delay does not occur on the outputted audio signals and, it is conceivable that the timing thereof cannot be matched with the audio signals after the cascade link process. Thus, variable delays for adjusting the differences in those timings can be provided between the variable delays 45 and the selectors 61 although such variable delays are not shown in FIG. 2.

Figure 5:
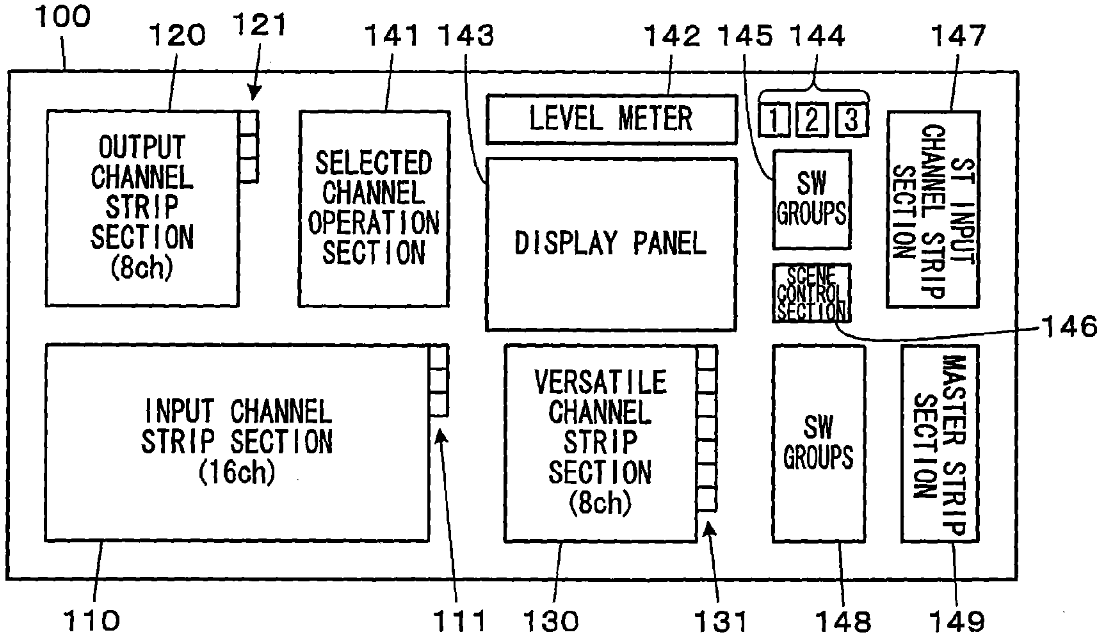
FIG. 5 is a diagram showing a configuration of an operation panel of a digital mixer 10 shown in FIG. 1.

FIG. 5 shows a configuration of the operation panel 100 of the digital mixer 10.

As shown in FIG. 5, the operation panel 100 includes various displays and controls.

Among them, an input channel strip section 110 is a section including channel strips for editing values of parameters used in signal processing in the input channels 43.

The channel strip is a group of controls for editing values of parameters related to a single channel. However, it is not necessary that values of all parameters of a single channel are edited by using the controls of the channel strip, and it is conceivable to provide an assignable control to which a parameter is assigned and which is used to edit a value of the assigned parameter, in the channel strip.

The input channel strip section 110 includes such channel strips for sixteen channels, and input channels are assigned to the respective channel strips so that the channel strip can serve as a control for editing values of the parameters of the assigned input channel.

Further, a plurality of assignment patterns, which are the correspondence relations between the channel strips and the input channels, are prepared in advance as input channel layers. Layer selection switches 111 corresponding to the respective input channel layers are provided. By operating the layer selection switches 111, the user can select an input channel layer corresponding to the operated switch, and assign the input channels to the respective channel strips of the input channel strip section 110 according to the assignment pattern of the selected input channel layers.

With respect to the sixteen channel strips, three input channel layers are prepared here as follows: an input channel layer for assigning 1st to 16th input channels; an input channel layer for assigning 17th to 32nd input channels; and an input channel layer for assigning 33rd to 48th input channels. The values of the parameters of the forty-eight input channels 43 can be edited using the sixteen channel strips by selecting proper layers.

The output channel strip section 120 is a section including channel strips for eight channels for editing values of parameters used in signal processing in the output channels 63. With respect to these eight channel strips, three output channel layers are prepared here as follows: an output channel layer for assigning 1st to 8th output channels; an output channel layer for assigning 9th to 16th output channels; and an output channel layer for assigning 17th to 24th output channels. Those output channel layers is selected by operating a corresponding switch of the layer selection switches 121. Accordingly, values of the parameters of the twenty-four output channels 63 can be edited using the eight channel strips.

Here, the assignment patterns of the layers related to the input channel strip section 110 and the output channel strip section 120 are fixed, and the data indication the patterns are stored in the flash memory 12 of the digital mixer 10.

On the other hand, a versatile channel strip section 130 is also a section including channel strips for eight channels. Users can freely edit the assignment patterns of the versatile layers, which defines channels to be assigned to the channel strips in the versatile channel strip section 130.

Figure 6:
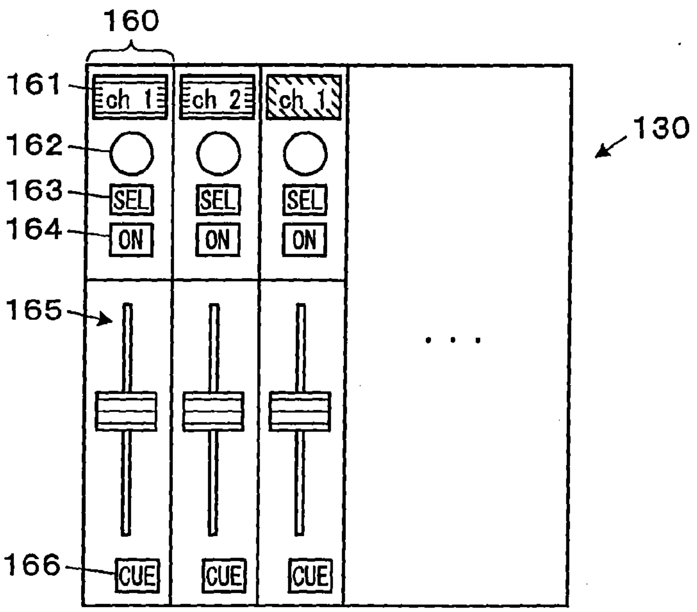
FIG. 6 is a diagram showing a configuration of channel strips in a versatile channel strip section shown in FIG. 5.

FIG. 6 shows a configuration of the channel strips in the versatile channel strip section 130.

As shown in FIG. 6, the channel strip 160 includes a display 161, a rotary encoder 162, a selection switch 163, an ON switch 164, a fader 165 and a cue switch 166.

The display 161 is a small liquid crystal panel having backlights of several different colors and serves as a display device for displaying character strings, which indicate channels assigned to corresponding channel strip, for example. The character strings used in this display are set by a user as a part of information of the versatile layer, as described below.

The display 161 displays which digital mixer's channel is being assigned to the channel strip 160 by the colors of the lightened backlights. In other words, the display 161 shows which digital mixer's parameters are edited using the controls of the channel strip 160. For example, a blue backlight is lightened when a channel of the digital mixer #1 is assigned to the channel strip, a green backlight is lightened when a channel of the digital mixer #2 is assigned, a red backlight is lightened when a channel of the digital mixer #3 is assigned, and a white backlight is lightened when a module not corresponding to any specific mixer.

The rotary encoder 162 and the fader 165 are assignable controls. For example, it is conceivable that a pan is assigned to the rotary encoder 162, and a fader is assigned to the fader 165. These assignments are executed in response to an operation of the controls in SW (switch) groups 145, 148 shown in FIG. 5. Further, the fader 165 corresponds to the moving fader 102 of FIG. 1.

The selection switch 163 is a control for selecting a corresponding channel as an operation target of the control of a selected channel operation section 141 and for displaying a screen, on a display panel 143, showing information related to the selected channel.

The ON switch 164 is a control for setting output ON/OFF of the corresponding channel.

The cue switch 166 is a control for setting output ON/OFF of the audio signal processed in the corresponding channel to a CUE bus which generates monitor signal.

It is not required to provide the same configuration to the channel strips provided to other channel strip sections such as the input channel strip section 110 and output channel strip section 120. In other words, it is conceivable that the numbers and types of the controls provided in the channel strips in each channel strip section are different from one another.

Back to FIG. 5, the layer selection switches 131 are switches for selecting the versatile layer to be used in an assignment of channels as regards the versatile channel strip section 130. Here, seven switches are provided, in total, including switches for selecting six types of versatile layers, which can be specified by a user, and a switch for selecting a fixed DCA layer.

Compared to the case of the input channel layers and output channel layers, more channels can be assigned to the versatile channel strip section 130 by the versatile layers and more information is included in the versatile layers. With this structure, accordingly, a process executed by the digital mixer 10 in response to the operation of the layer selection switches 131 is not only an assignment of channels to the channel strips of the versatile channel strip section 130. Other processes will be described later.

Regarding other portions on the operation panel 100, the selected channel operation section 141 is a section of controls for editing values of various parameter related to channels selected by the selection switch 163 shown in FIG. 6, for example.

A level meter 142 is a display displaying a level of the audio signal being processed in a section of the DSP 16, which is selected by a user.

The display panel 143 is a display displaying operation status of the digital mixer 10, a screen showing setting contents of each digital mixer, GUIs for accepting user's instructions, and the like.

Device selection switches 144 are switches for selecting one digital mixer (hereinafter, referred to as an "target device") of which parameters the digital mixer 10 edits in response to an operation of the controls provided on the operation panel 100 and displays the setting status by the display, among the digital mixers #1 to #3 constituting the mixer system 1. Here, since the respective digital mixers #1 to #3 are considered to have the same configuration of signal processing, settable parameter items are also the same. It is thus possible to switch the target device without changing the channels or parameter items to be edited by each control in response to an operation in the device selection switches 144.

It should be noted that selection of the target device in response to an operation of the device selection switches 144 is not applied here to the controls of the versatile channel strip section 130 and the ST input channel strip 147 (when the DCA layer is selected in the versatile channel strip section 130, such selection is exceptionally applied; however, for ease of explanation, such case is not considered in the following description if it is not mentioned). Further, the maximum device number of cascade connection is not necessarily limited to the number of the device selection switches 144. For example, it is conceivable that a part of the cascaded mixers are assigned to respective device selection switches 144 and other mixers are selected by the controls in the SW groups 145, 148.

The SW groups 145, 148 are sections of controls for assigning setting items to the assignable control, assigning channels to channel strips provided in the ST input channel strip section 147 and a master strip section 149, switching screens displayed on the display panel 143, operation on the GUIs displayed on the display panel 143, and performing other settings for the entire digital mixer 10.

A scene control section 146 is a section of controls such as an up/down key for selecting scenes, a store key for storing the selected scene, and a recall key for recalling the selected scene. In the mixer system 1, a set of values of parameters used in signal processing in the digital mixer is stored as a scene with a reference number for every digital mixer, and the scenes can be stored and recalled as needed according to user's operations. Two modes are provided here as follows: a mode for executing the storing and recalling for a mixer which is selected by the device selection switches 144; and a mode for simultaneously executing the storing and recalling for all digital mixers constituting the mixer system 1.

The ST (stereo) input channel strip section 147 has channel strips for two channels, for editing values of the parameters used in signal processing in the ST input channel for inputting stereo audio signals to the digital mixer 10, which is not shown in FIG. 2. The digital mixer 10 includes four ST input channels, and one of the ST input channel to be edited by the controls of the channel strip is assigned to each of the channel strip by using layers (ST input layers), similarly to the case of the input channel strip section 110.

However, it is different from the case of the input channel strip section 110 that the layer selection is executed on the GUI shown on the display panel 143 without using dedicated layer selection controls, and that the target device is specified in the ST input layer in addition to the channel numbers to be assigned to the channel strips. Regarding the ST input channel strip section 147, six layers are provided for assigning channels to the two channel strips as follows: a layer assigning 1st and 2nd ST input channels of the digital mixer #1; a layer assigning 3rd and 4th ST input channels of the digital mixer #1; a layer assigning 1st and 2nd ST input channels of the digital mixer #2; a layer assigning 3rd and 4th ST input channels of the digital mixer #2; a layer assigning 1st and 2nd ST input channels of the digital mixer #3; and a layer assigning 3rd and 4th ST input channels of the digital mixer #3.

The master strip section 149 includes two channel strips, which are not shown in FIG. 2, for editing values of parameters used in signal processing in ST output channels respectively corresponding to the ST mixing buses. The number of the ST output channels is two and it is the same as the number of the channel strips of the master strip section 149 so that it is not necessary to assign the channels using layers. However, it is determined which mixer's parameters are to be edited by the channel strip according to the operation of the device selection switch 144. Further, since the ST output channel includes an output channel of C in addition to LR, it is separately selectable parameters of which of LR or C is to be edited in the corresponding ST output channel.

Some of the characteristics of the mixer system 1 and the digital mixer 10 is the above described function of the versatile channel strip section 130 among the controls on the operation panel 100 and the content of the versatile layer selectable using the layer selection switches 131.

Among the channel strip sections described above, the versatile channel strip section is a first channel strip section including first channel strips, and the other channel strip sections are second channel strip sections including second channel strips.

Figure 7:
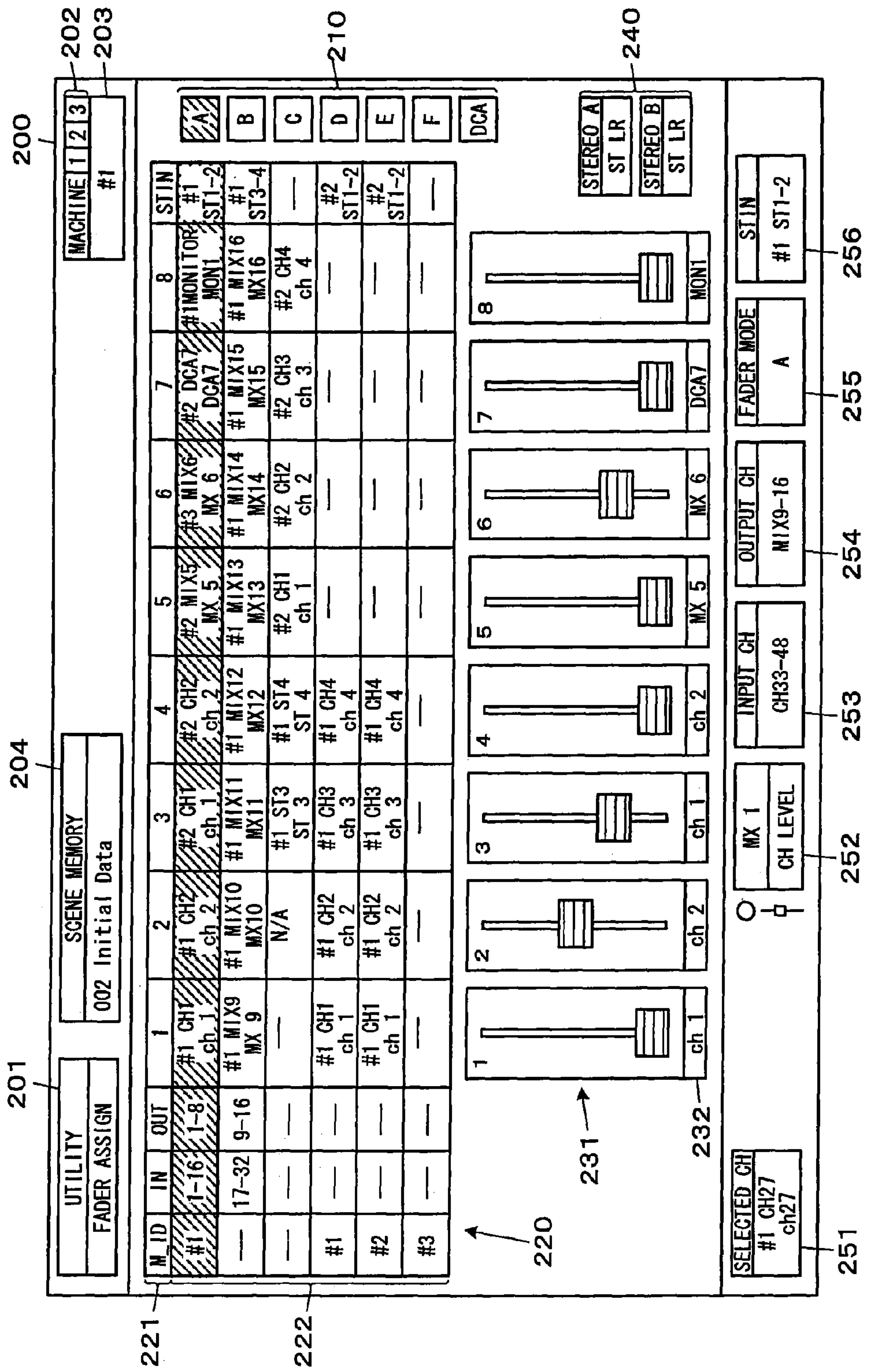
FIG. 7 is a diagram showing a display example of a layer setting screen used to set a content of a versatile layer.

FIG. 7 shows a display example of a layer setting screen for setting contents of the versatile layers.

The layer setting screen 200 is a GUI and one of the plural screens shown on the display panel 143 in response to the operation of the predetermined screen selection switches on the operation panel 100. The plural screens displayed on the display panel 143 show values of parameters and the like according to the purpose of the screens. Displays on the display sections 201 to 203 and 251 to 256 described below are made common among the plural screens.

In the layer setting screen 200, a screen section 201 is a section for showing the position of the presently displayed screen in the hierarchical GUI structure in the digital mixer 10. The example of in FIG. 7 shows a screen named "FADER ASSIGN" categorized in "UTILITY"

A connected device section 202 is a section for showing devices which are currently cascaded to the digital mixer 10 and constitute the mixer system 1. The example of FIG. 7 shows a configuration in which the three devices #1 to #3 constitute the mixer system 1. Here, a number applied to each device can be selected by a user or can automatically be determined. However, it is preferable to apply #1 (first) to the digital mixer having the operation panel for controlling the entire mixer system 1.

A target device section 203 is a section for showing the target device which is being selected by the device selection switches 144. The example of FIG. 7 shows a case where the digital mixer #1 is being selected. The target device is also shown using a background color of the various screens (including the layer setting screen 200) displayed on the display panel 143 so that the user can recognize the target device visually. For example, a blue-gray background color is used when the target device is the digital mixer #1, a greenish gray background color is used when #2, and reddish gray background color is used when #3.

A scene section 204 is a section showing a number and a name of a scene being edited in the target device, which is selected by the device selection switches 144. The example of FIG. 7 shows a case, in which a scene 002 named "Initial Data" is being edited.

A layer section 210 is a section showing buttons corresponding to the layer selection switches 131 on the operation panel 100, and displays which versatile layer is being selected by the layer selection switches 131. The example of FIG. 7 shows a case where a versatile layer A corresponding to the button, which is shown hatched, is being selected. The layer section 210 serves as a line index for indicating which layer's setting content is shown in each line (cell lines in a horizontal direction in FIG. 7) in an adjacent assignment pattern section 220. Further, the selected layers can be shown using colors, patterns, densities, frames and the like.

The assignment pattern section 220 is a section for showing contents of the versatile layers corresponding to the respective layer selection switches 131, and accepting editing operation. An item section 221 is a column index showing items, which are settable in the versatile layers. A content section 222 is a section showing setting contents of the layers. The columns are the cell lines in a vertical direction in FIG. 7.

Regarding the settable items in the versatile layers, assignments of channels to the respective channel strips for eight channels of the versatile channel strip section 130 is firstly specified, for example. These are the contents set to the columns indicated by "1" to "8" in the item section 221, and the input channels 43 and output channels 63 in FIG. 2, the ST input channels, ST output channels and monitor output channels can be assigned to the respective channel strips. Further, in addition to the channels, setting items, which does not have direct corresponding signal processing elements, can be also assigned to the channel strips. For example, each of eight DCA groups for adjusting signal levels and such groups can be assigned. Further, in addition to the above, various signal processing elements in the digital mixer 10, which have adjustable levels, can be assigned.

In the following description, in purpose of simplification, channels are used as elements to be assigned to the channel strips unless the element is specified. However, the following description can be applicable to a case of assigning other elements.

The channel assignment in the versatile layers can include indication of a number of the device constituting the mixer system 1, in addition to the channel number. In other words, the channel strips of the versatile channel strip section 130 can be assigned with any channel of any device among the devices constituting the mixer system 1. This assignment is not changed by an operation of the device selection switches 144.

In FIG. 7, the columns indicated by "1" to "8" have two lines for showing the channel to be assigned. The "#1" to "#3" in the upper lines indicate devices having channels to be assigned to the channel strips, and the character strings next to the device number indicate names of channels to be assigned to the channel strips. For example, "#1 CH1" means that the first input channel of the digital mixer #1 is assigned, and "#2 MIX5" means that fifth output channel of the digital mixer #2 is assigned. Further, "STx" represents the "x"-th ST input channel, and "DCAx" represents the "x"-th DCA group. The names of the channels are fixedly determined and cannot be changed by users.

In the columns of "1" to "8," the lower line shows character strings used for showing assignment status in the display 161 of channel strips assigned with channels according to the layers. The character strings can be freely set by the user, and it is preferable to set the string indicating the name or purpose of the channels, for example. The number of letters is 4 or less because of the limitation of its display size.

The versatile layer can include indication of the target device (M_ID), input channel layers (IN), output channel layers (OUT) and ST input layers (STIN), which are specified when the versatile layer is selected.

In the digital mixer 10, when a user selects the versatile layer using the layer selection switches 131, channels are assigned to the channel strips of the versatile channel strip section 130 according to the respective indications set in the columns "1" to "8" in the assignment pattern section 220, and, at the same time, the target device, an input channel layer and an output channel layer are selected according to the respective indications set in the columns "M_ID," "IN" and "OUT."

This selection is equivalent to the selection executed in response to operations of the device selection switches 144 and layer selection switches 111, 121.

Further, the ST input layer is selected according to the indication set in the column "STIN." This selection is equivalent to the selection executed in response to operations of the GUI shown on the display panel 143.

Then, the selections of the editing target device and layers in response to the selection of the versatile layer can be changed later by operating the device selection switches 144 and layer selection switches 111, 121 regardless of the versatile layer.

In the "M_ID," "IN," "OUT" and "STIN," indications of devices and layers to be selected in this function are set. In the column of "M_ID," the indications are shown by the names of the devices to be selected. In the columns of "IN," "OUT" and "STIN," indications are shown using channel numbers assigned by the layers to be selected.

Further, in the respective items shown in the item display 221, not only specific assignment indication but also "retainment (hold status)" can be set. In FIG. 7, the indication of "retainment" is shown as " - - - ." The digital mixer 10 leaves the status, that is, the assignment of the channel to the channel strip, the target device, the input channel layers and the like, regarding the items indicated as "hold status" in the selected versatile layer unchanged even when the versatile layer is selected.

Further, as regards the columns of "1" to "8," "no-assignment" can be indicated not to assign any channels to the channel strip. In FIG. 7, this indication is shown as "N/A." The digital mixer 10 does not assign any channel to the channel strips for which "no-assignment" is indicated in the selected versatile layer, when the versatile layer is selected. Then, when the control of the channel strip having no channel assigned is operated, the operation does not cause any change in the values of the parameters.

The all setting content displayed on the assignment pattern section 220 can be edited using the SW groups 145, 148. The DCA layer corresponding to a "DCA" button is a layer to be selected when the versatile channel strip section 130 is used as a control to set levels of the DCA groups. This layer is one of the versatile layers and its characteristic is different from other versatile layers. Since the assignment pattern of this layer is fixed to such one that 1st to 8th DCA gourds are respectively assigned to eight channel strips and "retainment" is indicated for other items, the content section 222 does not have a cell for displaying and setting the assignment pattern of this layer.

Further, the content section 222 also displays presently selected layers similarly to the layer section 210. The example of FIG. 7 shows a case where the versatile layer A corresponding to the hatched line is being selected.

In the layer setting screen 200, a fader section 231 is provided to correspond to the columns "1" to "8" of the item section 221. A position of a knob of the fader 165 in the channel strip is displayed for every channel strip, each of which corresponds to each of the columns of the item section 221, in the versatile channel strip section 130. This display is updated in response to the operation of the fader 165. Further, an assignment channel section 232 is provided under the fader section 231. The assignment channel section 232 shows information indicating the channels, which are assigned to corresponding channel strips, using character strings, which are set in the content display 222.

A master function section 240 is a section for showing parameters of which of LR and C of the respective ST output channels are to be edited by the two channel strips of the master strip section 149.

A selected channel section 251 is a section showing information of channels being selected by the selection switches of the channel strips and the like.

A knob & fader function section 252 is a section for showing functions assigned to the rotary encoder 162 and fader 165 in the channel strip of the versatile channel strip section 130. The upper portion in the drawing indicates a function of the rotary encoder 162, and the lower portion indicates a function of the fader 165. The example of FIG. 7 shows a case where a send level of the 1st mixing bus 44 is assigned to the rotary encoder 162 and a channel fader is assigned to the fader 165.

An input channel layer section 253 is a section for showing a currently selected input channel layer using numbers of input channels assigned to the input channel strip section 110. The example of FIG. 7 shows a case where the input channel layer which assigns the 33rd to 48th input channels is being selected.

An output channel layer section 254 is a section for showing a currently selected output channel layer using number of output channels assigned to the output channel strip section 120. The example of FIG. 7 shows a case where the output channel layer which assigns the 9th to 16th output channels is being selected.

A versatile layer section 255 is a section for showing a currently selected versatile layer. The example of FIG. 7 shows a case where a versatile layer A is being selected.

An ST input layer section 256 is a section showing a currently selected ST input layer using numbers of the device and ST input channels, which are assigned to the ST input channel strip 147. The example of FIG. 7 shows a case where an ST input layer which assigns 1st and 2nd ST input channels of the digital mixer #1 is being selected.

The displays of the layer sections 253 to 256 are changed when a corresponding layer is newly selected. This change is also executed when an input channel layer and the like is selected in response to a versatile layer selection.

A user of the mixer system 1 can set assignment patterns of the versatile layers as referring to the various settings on the above described layer setting screen 200. The set assignment patterns are stored as layer data corresponding to the respective versatile layers, which is a part of the current data, in the current memory, and stored as a part of scene when a scene is stored. Data indicating devices and layers to be selected is in response to a versatile layer selection is included in the layer data as link data.

It is sufficient if the layer data is stored only in the current memory of the digital mixer #1 which has the operation panel 100. However, in this embodiment, other digital mixers are also provided with a function to execute signal processing independently without cascading with the digital mixer #1. Accordingly, same type of current memories are provided to all digital mixers #1 to #3 constituting the mixer system 1. The layer data is thus stored in all the digital mixers #1 to #3. When different scenes are recalled in the respective mixers, it is considered that layer data stored in the current memory of each mixer are different to each other.

However, for example, it is conceivable that when the mixer system 1 is activated, a mixer having the operation panel 100 is specified as a master device, and layer data stored in other mixers are modified corresponding to the layer data stored in the master device, thereby a problem caused by the difference in the layer data is prevented.

Meanwhile, another characteristic of the mixer system 1 and digital mixer 10 is the cascade link function described above referring to the FIGS. 2 to 4, and an output channel function link function for linking parameters between the output channels to which audio signals are supplied from the same line of the cascade buses 52 when the cascade link is executed.

Figures 8, 9:
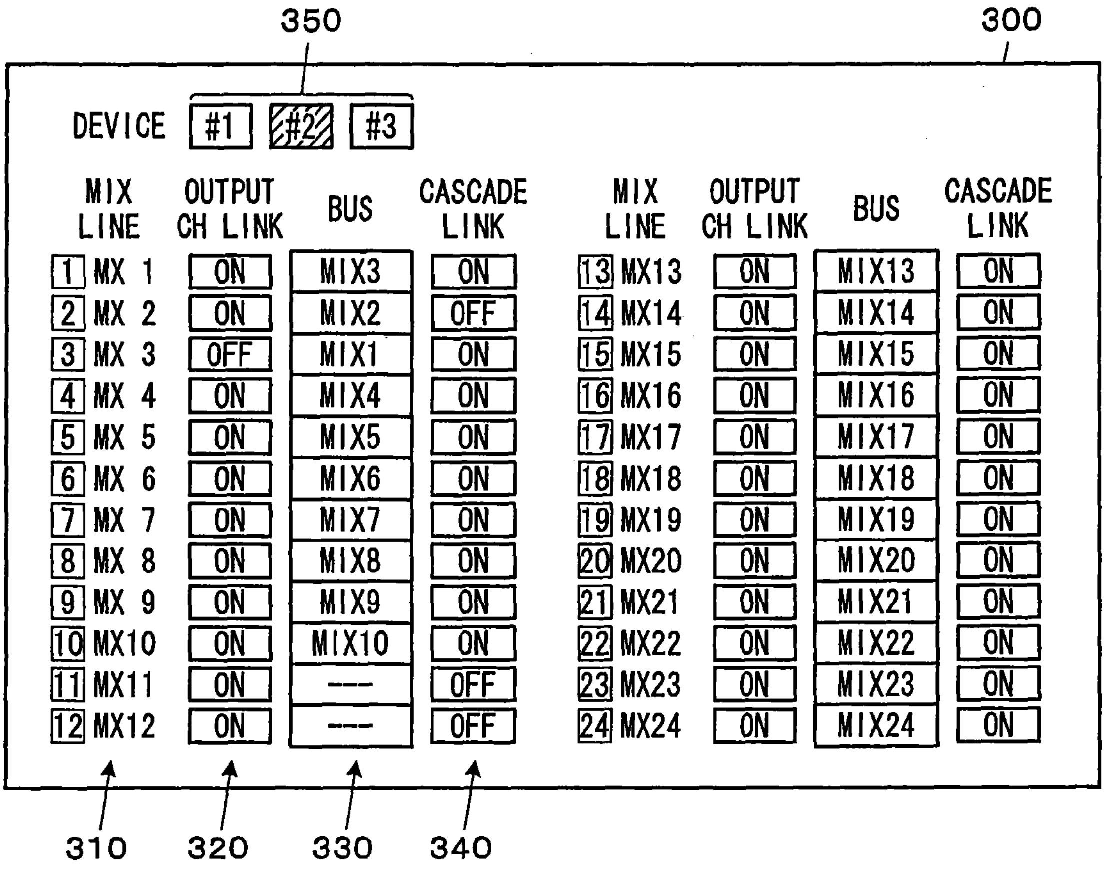
FIG. 8 is a diagram showing a display example of a cascade link setting screen used to accept settings related to a cascade link and an output channel link.
FIG. 9 is a diagram showing an example of data set in the cascade link setting screen of FIG. 8.

FIG. 8 shows an example of a display of a cascade link setting screen for accepting a setting related to the cascade link and output channel link.

The cascade link setting screen 300 is a GUI shown on the display panel 143. FIG. 8 shows only display sections between the sections corresponding to the sections 201 to 203 and sections 251 to 256 in FIG. 7, among the display sections shown on the display panel 143.

The cascade link setting screen 300 includes a cascade line section 310, output channel link setting buttons 320, a bus setting section 330, cascade link setting buttons 340, and device selection buttons 350.

The cascade line section 310 shows the lines of the cascade buses 51, 52 shown in FIG. 2, and the cascade link setting screen 300 accepts, for each of the lines, settings by the output channel link setting buttons 320, bus setting section 330, and cascade link setting buttons 340.

The bus setting section 330 is a section for setting, for every line of cascade buses 51, 52, a mixing bus 44 from which the output signal is added to the cascade bus. Only a single mixing bus 44 can be set for a line, and a mixing bus 44 can be set to only a single line. Accordingly, the lines and mixing buses 44 are thus correspond to each other basically in one-to-one relation. Further, this setting can be considered as settings of the mixing buses 44 being output resources for each lines of the cascade bus 51, 52, or as settings of lines of the cascade buses 51, 52 being output destinations for the respective mixing buses 44.

It is not necessary to set mixing buses 44 to all line (see lines of MX11 and MX12 in FIG. 8). The audio signal mixed in the mixing buses 44, which are not set to any line, are directly outputted to the corresponding output channel 63 without being added to the cascade bus 51.

The cascade link setting buttons 340 are buttons for setting ON/OFF of the cascade ON switch 46 corresponding to the mixing bus 44 set in the bus setting section 330, that is, whether or not to add the audio signals from the mixing bus 44 to the cascade bus 51. The cascade link is always set OFF regarding the lines for which the mixing buses 44 are not set.

The settings made by the bus setting section 330 and cascade link setting buttons 340 can be executed separately in every mixer. The device selection buttons 350 are buttons for selecting a mixer for which settings are executed in the cascade link setting screen 300. When the device selection buttons 350 are operated, the displays of the bus setting section 330 and cascade link setting buttons 340 are updated to the setting content of the newly selected mixer. The example of FIG. 8 shows a case where setting is being executed on parameters related to the digital mixer #2, which is selected by the device selection button hatched in the drowning.

The output channel link setting buttons 320 are buttons for setting whether or not to execute output channel link to maintain (synchronize) values of the parameters of the output channels 63, to which audio signals are supplied from a common line of the cascade bus 52 in the mixer system 1, to be common values, for respective lines of the cascade buses 52. The ON/OFF settings of the output channel link is common to all the mixers so that the display of the output channel link setting buttons 320 is not changed even when the selection of mixers is changed by the device selection buttons 350.

In the mixer system 1, the output channels, whose parameter values are to be linked, can be set in view of that audio signals are supplied from the common line of the cascade bus 52. Accordingly, even when the same signals are supplied from a single line of the cascade bus 52 to output channel having different numbers in each mixer, the parameters of those output channels can be linked by a simple operation. When such a linking is executed, completely same output signals can be obtained from those output channels 63 since the output channels 63 receiving the same audio signals execute signal processing using the same values of parameters.

In the mixer system 1, the flexibility for cascade linking is increased since the audio signals outputted from mixing buses 44 having different numbers can be added in one line of the cascade bus 51 in every mixer. On the other hand, the addition result can be supplied to the output channels having different numbers in each mixer, and thus the correspondence relation between those output channels are slightly difficult to recognize.

However, since output channels, whose parameter values are to be linked, can be set based on the range of output channels, to which audio signals are supplied from a common line of the cascade bus 52, as described above, it is possible to easily and properly set links between output channels, to which the same audio signals are supplied even when an audio signal outputted from one line of the cascade bus 52 is supplied to output channels having different numbers in each mixer.

With the above described purpose, linking of parameter values is not executed in the output channels 63 corresponding to the mixing buses 44, in which cascade link setting is set OFF, even in case of the output channels 63 corresponding to the mixing buses 44, to which a line of the output channel link ON is set. It is meaningless to execute linking since audio signals from the cascade buses 52 are not supplied to the output channels 63.

FIG. 8 shows a screen for accepting settings of cascade links and output channel links for audio signals mixed in twenty-four monaural mixing buses 44. In order to execute a cascade link or an output channel link in other buses such as ST buses and AUX buses, preferably, screens for accepting the setting related to those buses are prepared to accept the settings in the same way for the respective types of buses and to execute process for realizing cascade links or output channel links according to the accepted setting contents.

FIG. 9 shows an example of data set in the cascade link setting screen 300.

As shown in FIG. 9, as a setting content related to the cascade link and output channel link, there is firstly a setting of output channel link (OUTPUT CH LINK) ON/OFF, which is common to all mixers, related to the ID (LINE ID) of each line of the cascade buses 51, 52. Further, as settings for each mixer, there are a setting of ID of the mixing bus 44 (BUS) supplying audio signals to the cascade bus 51, and a setting of whether or not to supply audio signals to the cascade bus 51 (CASCADE LINK) in actual.

Such data is stored in the current memory as data common to each digital mixer and the data can be stored and recalled separately from the scenes since the data is not included in scenes.

Further, for example, when the data shown FIG. 9 is stored in the current memory, the 5th output channel of the digital mixer #1, the 3rd output channel of the digital mixer #2 and the 1st output channel of the digital mixer #3 are linked as an output channel link related to the cascade bus in the MX1 line. In this case, when values of parameters of one of those output channels are changed, same changes are provided to the values of the parameters of other two output channels.

As an output channel link related to cascade buses of MX2 line, only the 4th output channel of the digital mixer #1 and the 2nd output channel of the digital mixer #3 are linked since cascade link OFF is set regarding the digital mixer #2. Regarding the cascade buses in the MX3 line, linking is not executed in any of the output channels since output channel link OFF is set.

When an output channel link is newly started, values of parameters of one of the output channels to be linked can be copied to the other output channels to be linked, before starting the link. For example, it is considered that the values in output channels of the digital mixer having the smallest number are copied. When a new output channel to be linked is added to the current link, values of parameters of one of the output channels, which are currently linked, can be copied to the output channel to be added.

As clearly described above, in the mixer system 1, a user can set values of parameters used in the signal processing by the digital mixers and store or recall scenes for all digital mixers constituting the mixer system 1 by operating the operation panel 100 of the digital mixer #1. In other words, the user can remotely control the digital mixers #2, #3 using the digital mixer #1.

A configuration and operations of each digital mixer for realizing the remote control will be described.

Figure 10:
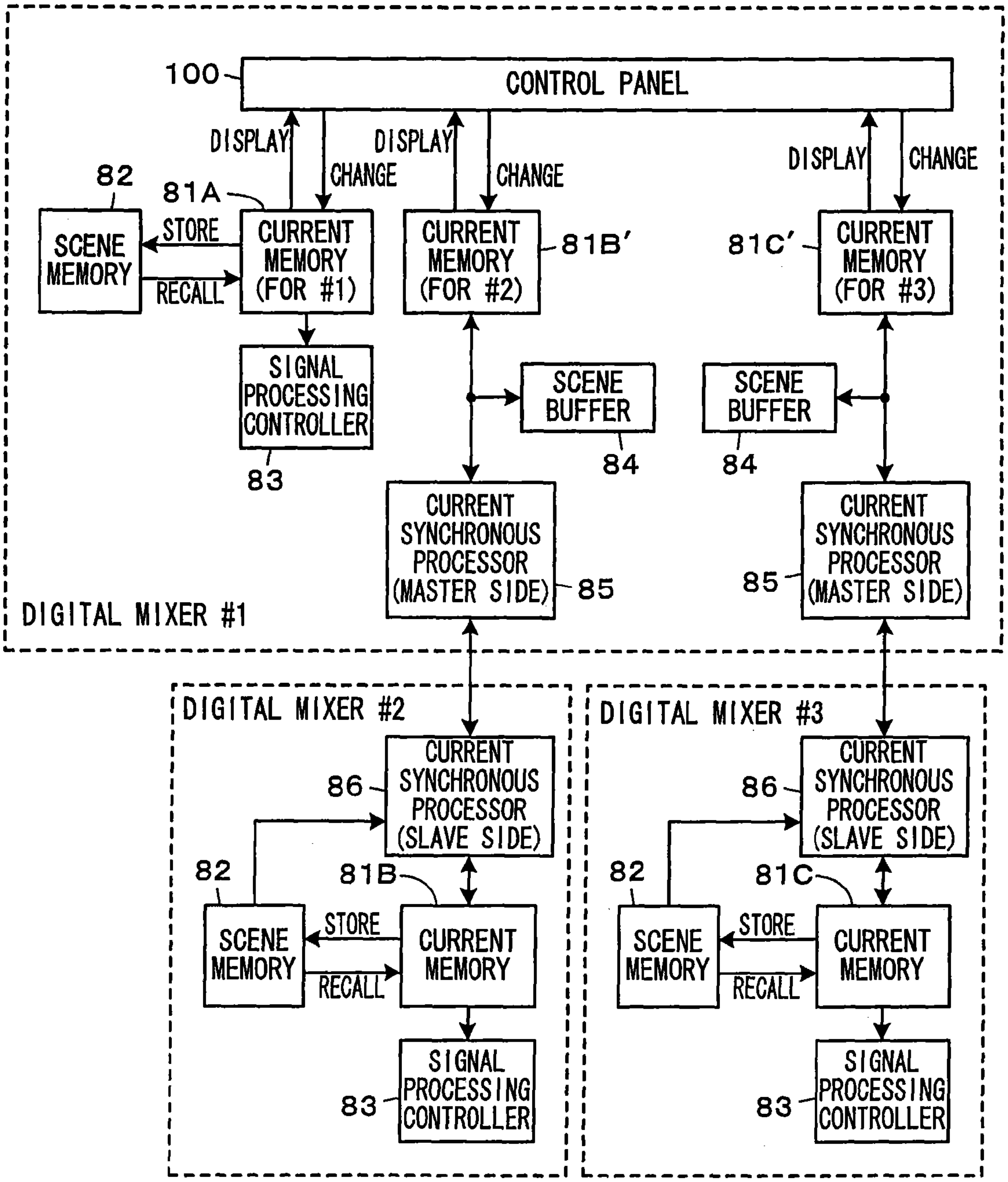
FIG. 10 is an explanatory diagram of a remote control function in the mixer system in FIG. 1.

FIG. 10 is an explanatory diagram of the remote control function.

As shown in FIG. 10, in the mixer system 1, the digital mixer #1 includes a current memory 81 (81A) for storing values of parameters used in signal processing in the digital mixer #1. The stored values can be stored as a scene into a scene memory 82 provided in the flash memory 12, and the scenes stored in the scene memory 82 can be recalled to the current memory 81A.

When the content (parameter value) of the current memory 81 is changed, the digital mixer #1 immediately supplies the changed value to a signal processing controller 83. The signal processing controller 83 obtains a coefficient to be set to the DSP 16 based on the values of the parameters after the change, and sets the coefficient to a register in the DSP 16 to reflect the changed value to the signal processing. The parameter values stored in the current memory 81A is thus reflected to the signal processing in the DSP 16 in real time.

Figure 11:
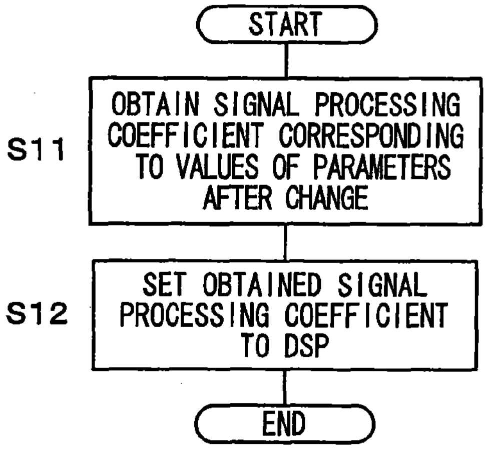
FIG. 11 is a flowchart of a process executed by a CPU of the digital mixer when a content of a current memory 81A shown in FIG. 10 is changed.

FIG. 11 shows a flowchart of a process executed by the CPU 11 when the content of the current memory 81A is changed.

The CPU 11 executes processes of steps S11, S12 when the content of the current memory 81A is changed and works as the signal processing controller 83.

The reason why the content of the current memory 81A in not directly set to the DPS 16 is that values of some parameters such as DCA group levels will affect on values of other parameters.

In the mixer system 1, each of the digital mixers includes the above described current memory 81, scene memory 82 and signal processing controller 83. The digital mixers can independently store or recall scenes and reflect the content of the current memory 81 to signal processing in the DSP 16.

The digital mixer #1 has a function for changing the content of the current memory 81 and displaying the content of the current memory 81 on the operation panel 100 according to operations in the operation panel 100. The digital mixer #1 can execute such operations promptly enough for its own current memory.

However, data transmission delay occurs when the digital mixer #1 accesses to the current memories of other digital mixers #2, #3. Hence, it is difficult to promptly reflect the changed contents in the current memories 81 of the digital mixers #2, #3, which are made in response to operations on the operation panel 100, to the display on the operation panel 100.

Thus current memories 81B', 81C' for storing values of parameters used in the signal processing in the digital mixers #2, #3 are provided in the digital mixer #1, and the changes in the current memory, which is made in response to operations on the operation panel 100, are once executed on the current memories 81B', 81C'. The display on the operation panel 100 is shown based on the contents of the current memories 81B', 81C'.

Such accesses to the current memories 81B', 81C' by the digital mixer #1 can be executed using a common program since the difference from the access to the current memory 81A is only the memory addresses. User's operational feeling is thus the same in a case editing the content of the current memory 81A and a case editing the contents of the current memories 81B', 81C'.

On the other hand, the changes in the current memories 81B', 81C' are promptly reflected to current memories 81B, 81C provided in the digital mixers #2, #3 by a current synchronous processor 85 in the digital mixer #1 and current synchronous processors 86 in the digital mixers #2, #3, and the contents in the currents memories 81B', 81C' and the contents in the current memories 81B, 81C are matched to synchronize the stored contents in those memories. According to the synchronization, the changes made in the current memories 81B', 81C' are reflected to the signal processings in the digital mixers #2, #3. In this reflection, delay corresponding to a transmission delay occurs; however, it is not a serious problem compared to the delay of display in view of the real time performance of the operation.

Figure 12:
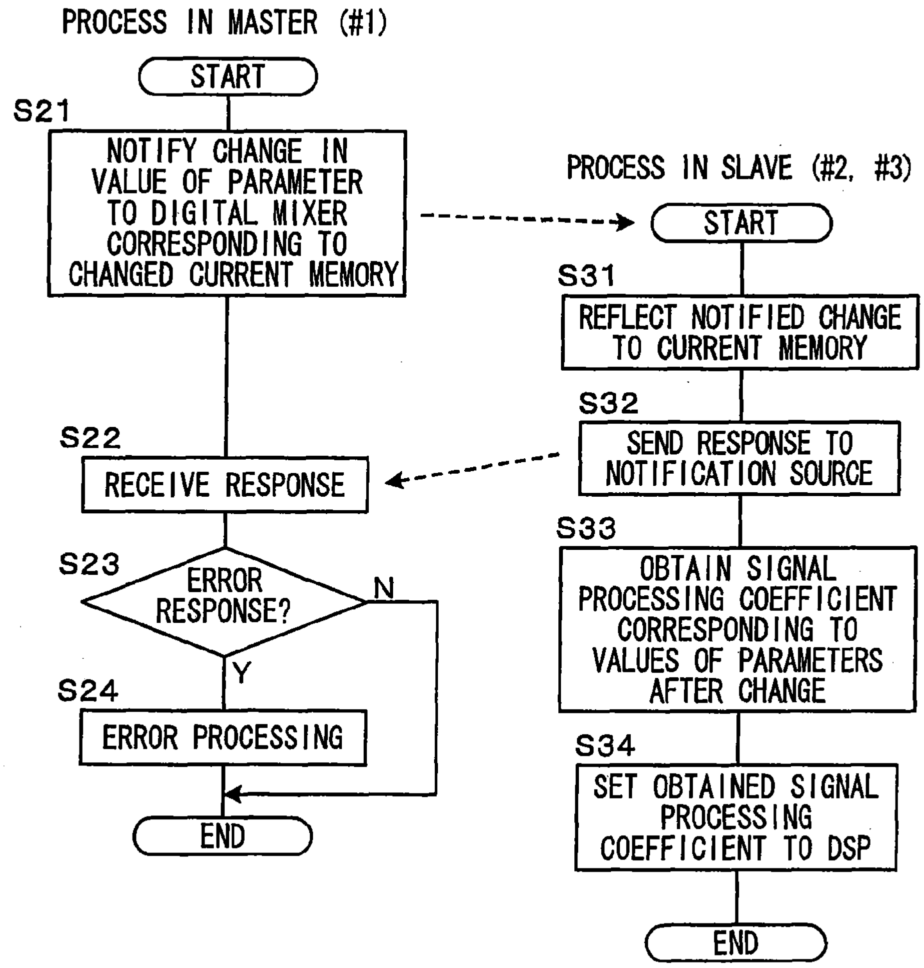
FIG. 12 is a flowchart of processes executed by the CPUs of the digital mixers when a content of a current memory 81B' or 81C' shown in FIG. 10 is changed.

FIG. 12 shows a flowchart of processes executed by the CPUs 11 of the digital mixers #1, #2 and #3 when the content of the current memory 81B' or 81C' is changed.

The CPU 11 of the digital mixer #1 starts the process of the flowchart shown in the left side of FIG. 12 to notify a change in the value of the parameter to the digital mixer corresponding to the changed current memory when the content in the current memory 81B' or 81C' are changed (S21).

When receiving the notification, the CPU 11 of the digital mixer #2 or #3 starts the process of the flowchart shown in the right side of FIG. 12 to reflect the notified change to its own current memory (S31), and send a response to the digital mixer #1 (S32). Then, similarly to the process of FIG. 11, the CPU 11 obtains a signal processing coefficient based on the values of the parameters after the change, set the coefficient to the DSP 16 (S33, S34), and finishes the process.

On the other hand, the digital mixer #1 waits for a response from the notification target in step S21 (S22), and finishes the process when the received response is not an error response (S23). When it is an error response, the digital mixer #1 executes an error processing (S24) and finishes the process.

The CPU 11 of the digital mixer #1 serves as the current synchronous processor 85 according to the above process. The CPUs 11 of the digital mixers #2, #3 serve as the current synchronous processors 86 and signal processing controllers 83 according to the above process.

A process for storing and recalling scenes will be described.

For example, in order to store a scene in the digital mixer #2, the content of the current memory 81B in the digital mixer #2 is simply stored to the scene memory 82 of the digital mixer #2. Thus, it is not required to change the content of the current memory 81B' in the digital mixer #1.

However, when a scene is recalled in the digital mixer #2, it is required to copy the recalled scene to the current memory 81B' of the digital mixer #1. In this case, it takes time to transfer if the scene data is transferred from the digital mixer #2 to the digital mixer #1 after the recall instruction is received.

In view of this problem, when a scene, which is a candidate for recalling selected by using an up/down button and the like, is displayed on the operation panel 100, the digital mixer #1 transmits the information to the digital mixer #2 to control the digital mixer #2 to read data of the displayed scene from the scene memory 82 and transfer to the digital mixer #1. Then the digital mixer #1 stores the transferred scene data to a scene buffer 84. The recall of the scene can be promptly executed by copying the data stored in the scene buffer 84 to the current memory 81B' at the timing of an actual recall instruction. When a recall is executed in the digital mixer #2, a recall instruction is sent to the digital mixer #2 and the digital mixer #2 can execute according to the instruction. Further, the scene buffer 84 can be provided in the RAM 13.

In the mixer system 1, since the respective digital mixer has the above describe functions, it is possible to comfortably execute remote control of operations of the digital mixers #2, #3 by using the operation panel 100 provided to the digital mixer #1.

Processes performed by the CPU 11 for realizing the above described functions including a selection of a target device, a layer selection, a versatile layer selection, a parameter edit using layers, and an output channel link will be described later.

Table 1 shows a list of major registers and parameters used in the processes described below. The registers and parameters in Table 1 are stored in the current memory. The items, in which the device independence is shown "YES," are stored and referred as values independently prepared for respective digital mixers #1 to #3 in the current memory of the respective digital mixers #1 to #3. The items, in which the device independence is shown "NO," are stored and referred as values common to all the digital mixers #1 to #3 in the current memory of the digital mixer #1. Here, in order to match the forms of the current memories, the same value as stored in the digital mixer #1 are stored in the current memories of the digital mixers #2, #3.

Figure 13:
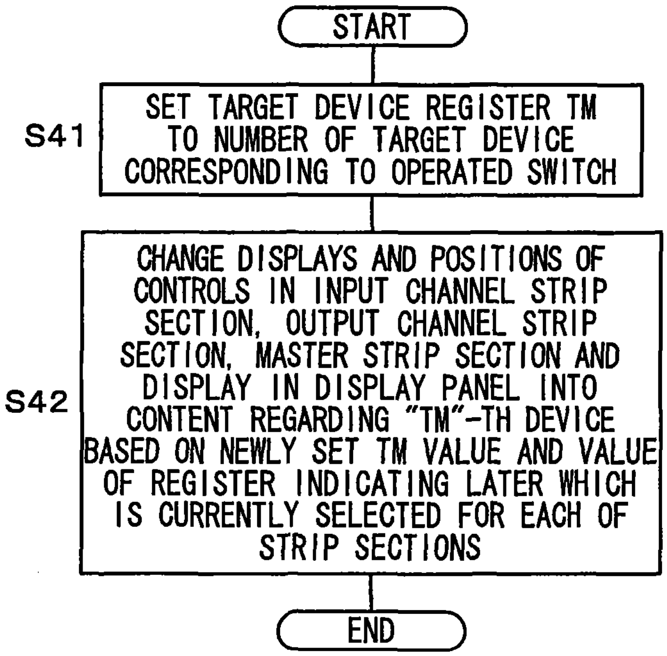
FIG. 13 is a flowchart of a process executed by the CPU of the digital mixer #1 shown in FIG. 1 when a device selection switch is operated.

FIG. 13 shows a flowchart of a process executed by the CPU 11 of the digital mixer #1 when the device selection switch 144 is operated.

When the device selection switch 144 is operated on the operation panel 100, the CPU 11 of the digital mixer #1 starts the process shown in flowchart of FIG. 13. The CPU 11 sets a number of the target device corresponding to the operated switch to the target device register TM (S41). Then, the CPU 11 changes the displays and positions of controls in the input channel strip section 110, the output channel strip section 120, and the master strip section 149, and changes the display in the display panel 143 based on the content regarding the "TM"-th device according to the newly set TM value and a value of the register indicating a layer which is currently selected for each of the strip sections (S42), and finishes the process.

Some of the channel strips have small displays and LEDs, which show assigned channels, target device information or parameter values, and display contents in these displays are changed in step S42. Further, the controls, whose positions are changed in step S42, are ones having a driver, for example, the moving fader 102, and the positions of their knobs are to be matched to the values of the corresponding parameters. In other processes shown in the flowchart, the changes of displays and controls in the channel strip section have similar meaning.

According to the process of FIG. 13, it is possible to switch target devices in response to the operation on the device selection switch 144. The CPU 11 serves as a mixer selector in this process.

Figure 14:
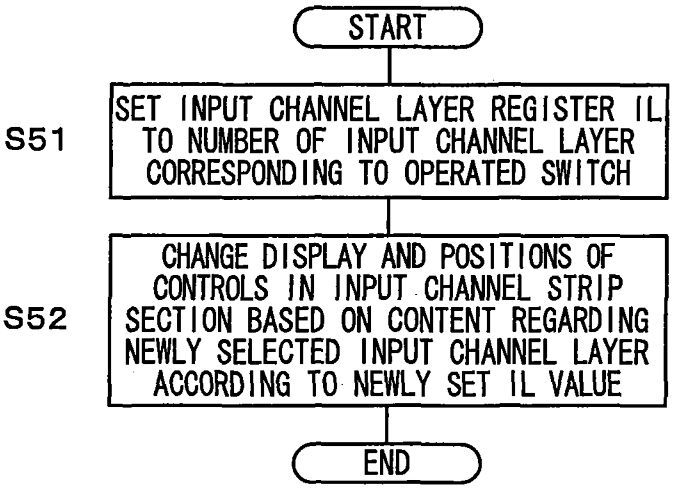
FIG. 14 is a flowchart of a process executed by the same CPU when a layer selection switch for selecting an input channel layer is operated.

FIG. 14 shows a flowchart of a process executed by the CPU 11 of the digital mixer #1 when some of the layer selection switches 111 for selecting an input channel layer is operated.

When some of the layer selection switches 111 is operated, the CPU 11 of the digital mixer #1 starts the process of the flowchart in FIG. 14. The CPU 11 firstly set the input channel layer register IL to a number of the input channel layer corresponding to the operated switch (S51).

Then, the CPU 11 changes the displays and positions of controls in the input channel strip section 110, changes the display on the display panel 143 based on the content regarding the newly selected layer according to the newly set IL value (S52), and finishes the process.

According to this process, it is possible to switch the input channel layer, which is a second layer, in response to an operation on the layer selection switches 111. The CPU 11 serves as a second layer selector in this process.

Figure 15:
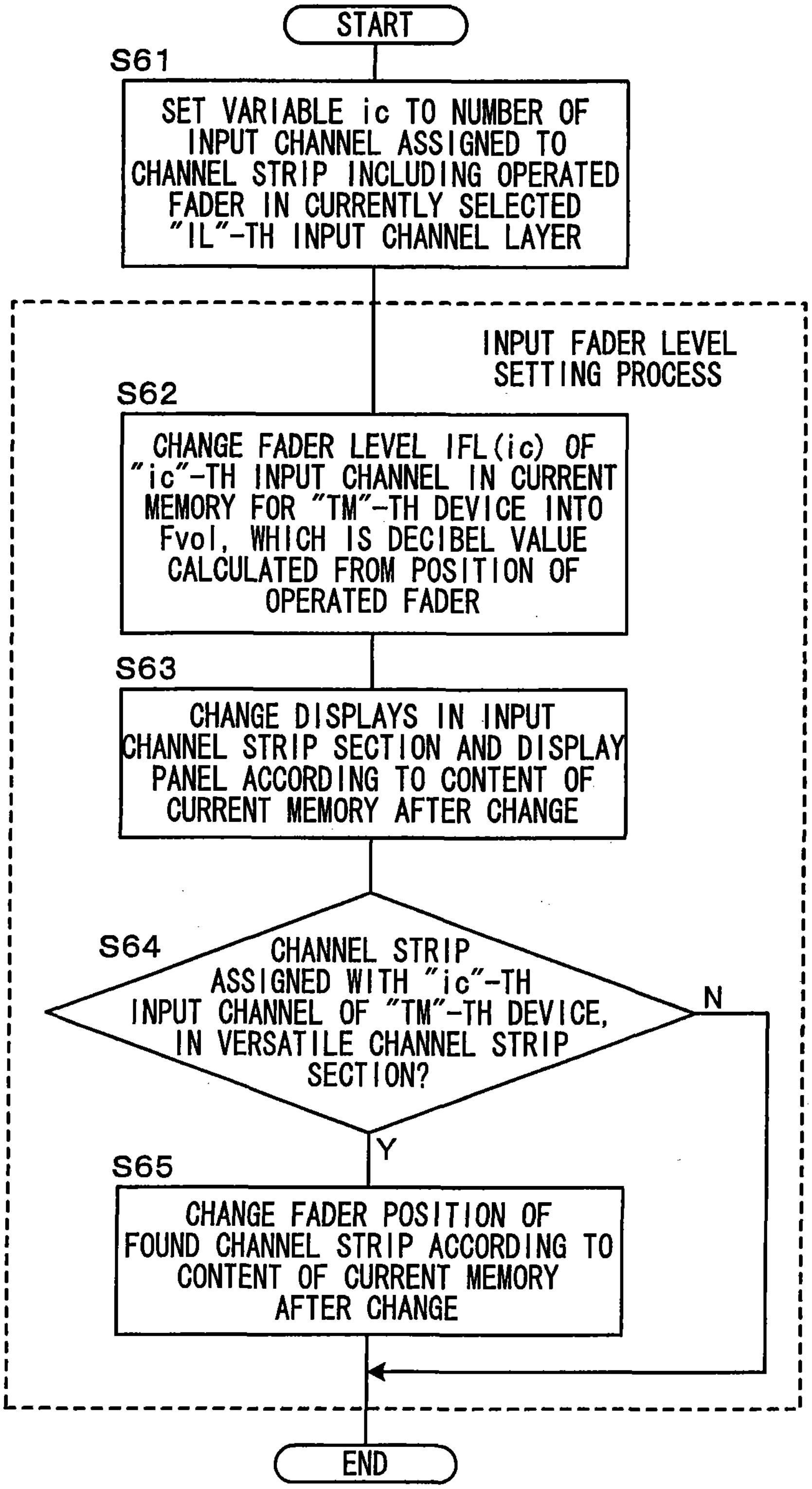
FIG. 15 is a flowchart of a process executed by the same CPU when a fader of an input channel strip is operated.

FIG. 15 shows a flowchart of a process executed by the CPU 11 of the digital mixer #1 when a fader of the input channel strip section 110 is operated.

When some fader (or control assigned with a fader parameter) of a channel strip of the input channel strip section 110 is operated, the CPU 11 of the digital mixer #1 starts the process of the flowchart in FIG. 15.

The CPU 11 firstly refers to the layer data corresponding to "IL"-th input channel layer, which is currently selected, and sets a variable ic to the number of an input channel assigned to the channel strip including the operated fader in the "IL"-th layer (S61).

Then, the CPU 11 changes the fader level IFL(ic) of the "ic"-th input channel in the current memory for the "TM"-th device into a value Fvol, which is a decibel value calculated from the position of the operated fader (S62). Further, the CPU 11 changes the displays in the input channel strip section 110 and display panel 143 according to the content of the current memory after the change (S63).

Further, when there is a channel strip assigned with the "ic"-th input channel of the "TM"-th device in the versatile channel strip section 130 (S64), the CPU 11 changes the fader position of that channel strip according to the content of the current memory after the change (S65), since it is considered that the fader level changed in step S62 is shown in that channel strip. Then, the CPU 11 finishes the process. When the result is "NO" in step S64, the process is simply finished.

According to the above process, when a fader of the input channel strip section 110 is operated, values of parameters of an input channel which is assigned to a channel strip having the operated fader by the selected input channel layer can be edited. It is noted that the same edition can also be executed when a control other than the fader is operated. The CPU 11 serves as a second parameter editor in this process.

Here, in the versatile channel strip section 130, the processes in step S64, S65 are not required when parameters other than the channel fader is assigned to the fader 165 and the fader level value is not indicated by a position of a control, a display or the like. It is the same in processes shown in following flowcharts.

When the process in step S62 of FIG. 15 is executed, the content of the current memory is changed as a result. The CPU 11 is triggered by the step S62 to execute the process shown in FIG. 11 or 12 in response and reflects the contents of the current memory after the change to the signal processing in the DSP 16.

Figure 16:
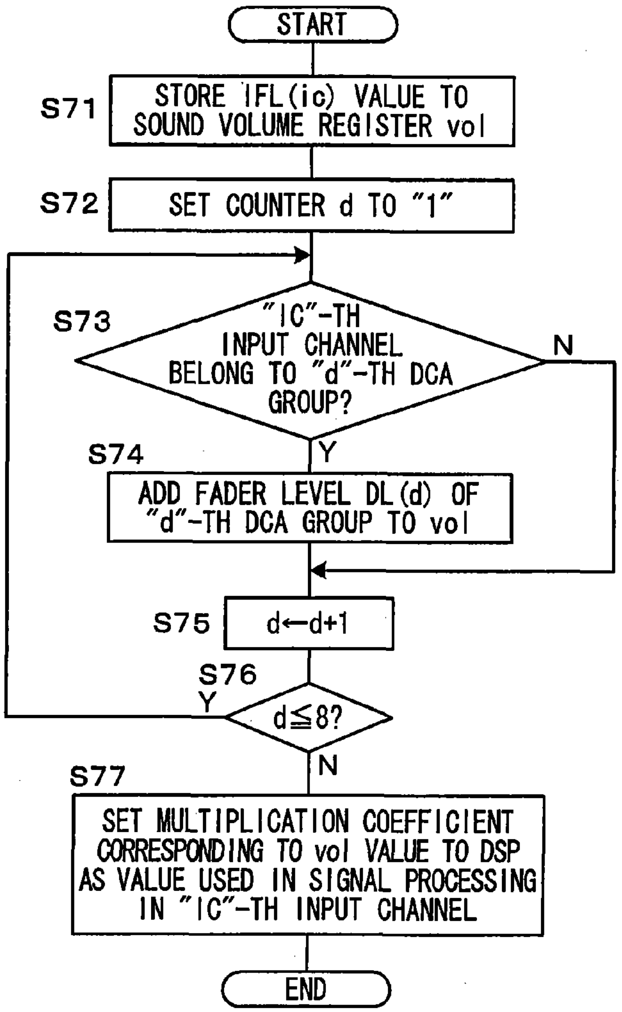
FIG. 16 is a flowchart of a process executed by the same CPU for reflecting a change in a fader level of the input channel to signal processing in a DSP.

FIG. 16 shows a flowchart of a process for reflecting the changes in the fader level of the input channel to the signal processing in the DSP 16, as an illustrative example of a process shown in steps S11, S12 in FIG. 11 and steps S33, S34 in FIG. 12.

This process is executed by the CPU 11 of the "TM"-th digital mixer, in which the parameter value is changed.

When detecting the change in the fader level IFL(ic) of the input channel in its own current memory, the CPU 11 starts the process shown in the flowchart of FIG. 16.

The CPU 11 firstly stores the IFL(ic) value to a sound volume register vol (S71) and sets the counter d to "1" (S72).

Then, the CPU 11 repeats a process for adding the fader level DL(d) of the "d"-th DCA group to the vol if the "ic"-th input channel belongs to the "d"-th DCA group, as incrementing the d one by one starting with d=1 until d=8 (S73 to S76).

Here, the DL(d) is a decibel value and can be a negative value. Further the DCA group is defined in each mixer. According to the processes in steps S73 to S76, the vol value is calculated as a value, in which the fader levels of the respective DCA groups are taken into account upon the fader level of the input channel.

Then, the CPU 11 obtains a multiplication coefficient corresponding to the vol value and sets the value to the DSP 16 as a value used in the signal processing in the "ic"-th input channel (S77), and finishes the process.

According to the above process, the CPU 11 can reflect the contents of the current memory after the change to the signal processing in the DSP 16.

Figure 17:
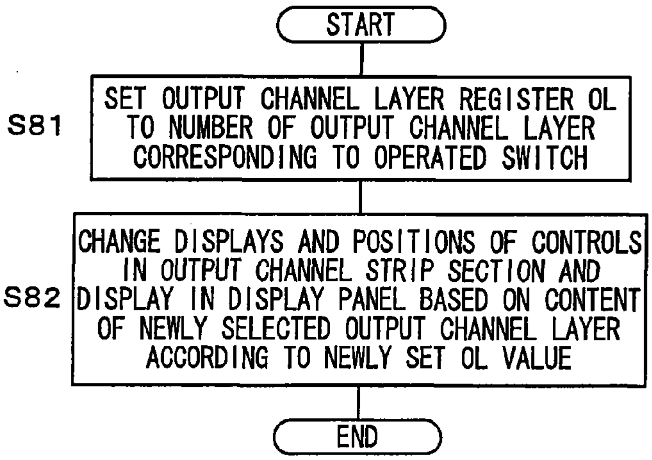
FIG. 17 is a flowchart of a process executed by the same CPU when a layer selection switch for selecting an output channel layer is operated.

FIG. 17 shows a flowchart of a process executed by the CPU 11 of the digital mixer #1 when some of the layer selection switches 121 for selecting an output channel layer is operated.

When some of the layer selection switches 121 are operated, the CPU 11 of the digital mixer #1 starts the process of the flowchart in FIG. 17. The CPU 11 firstly sets the output channel layer register OL to a number of an output channel layer corresponding to the operated switch (S81).

Then, the CPU 11 changes the displays and positions of controls in the output channel strip section 120, changes the display in the display panel 143 based on the content of newly selected layer according to the newly set OL value (S82), and finishes the process.

According to the above process, it is possible to switch the output channel layer, which is also a second layer, in response to an operation on the layer selection switches 121. The CPU 11 also serves as a second layer selector in this process.

Figure 18:
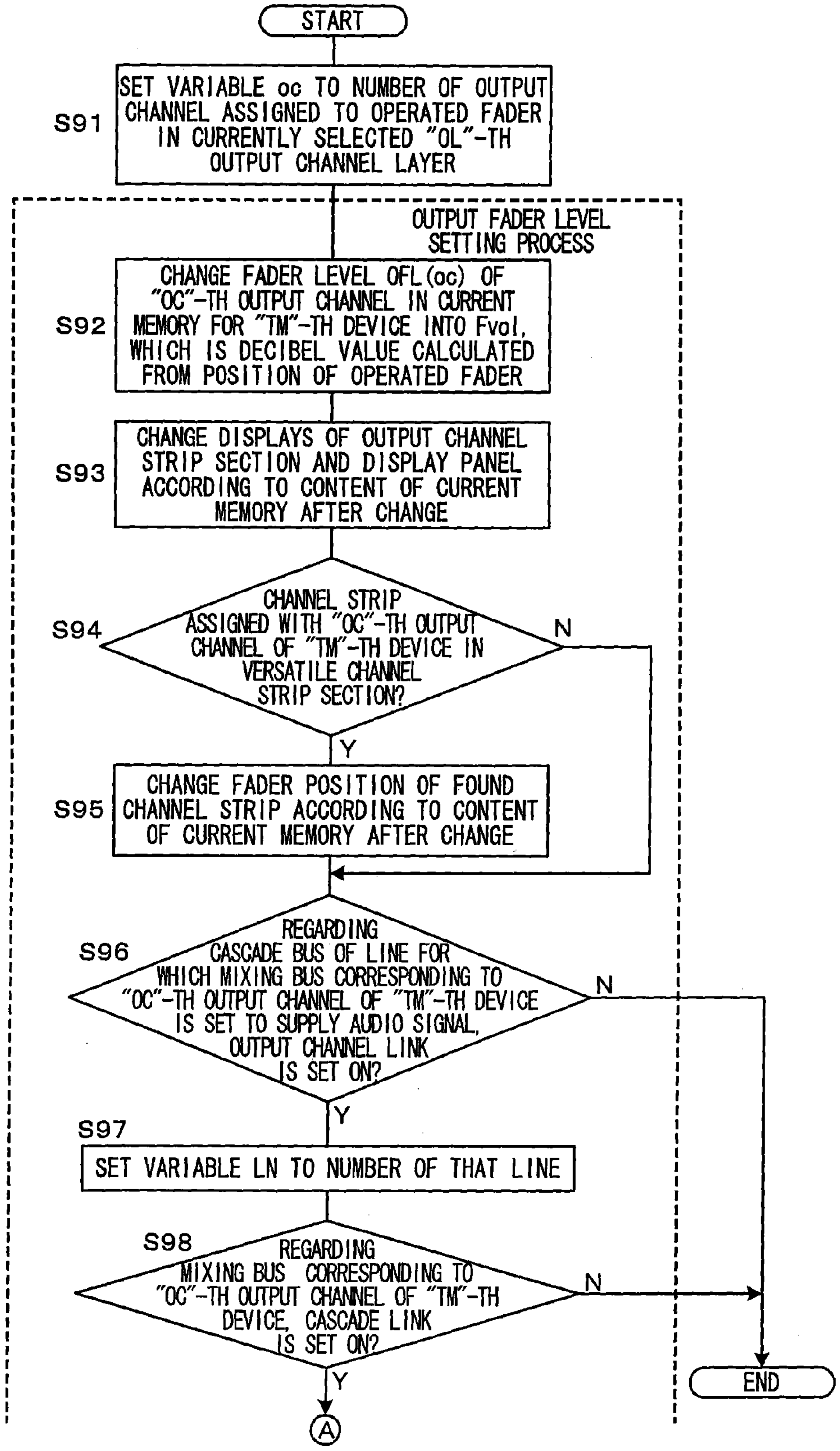
FIG. 18 is a flowchart of a process executed by the same CPU when a fader of an output channel strip section is operated.
Figure 19:
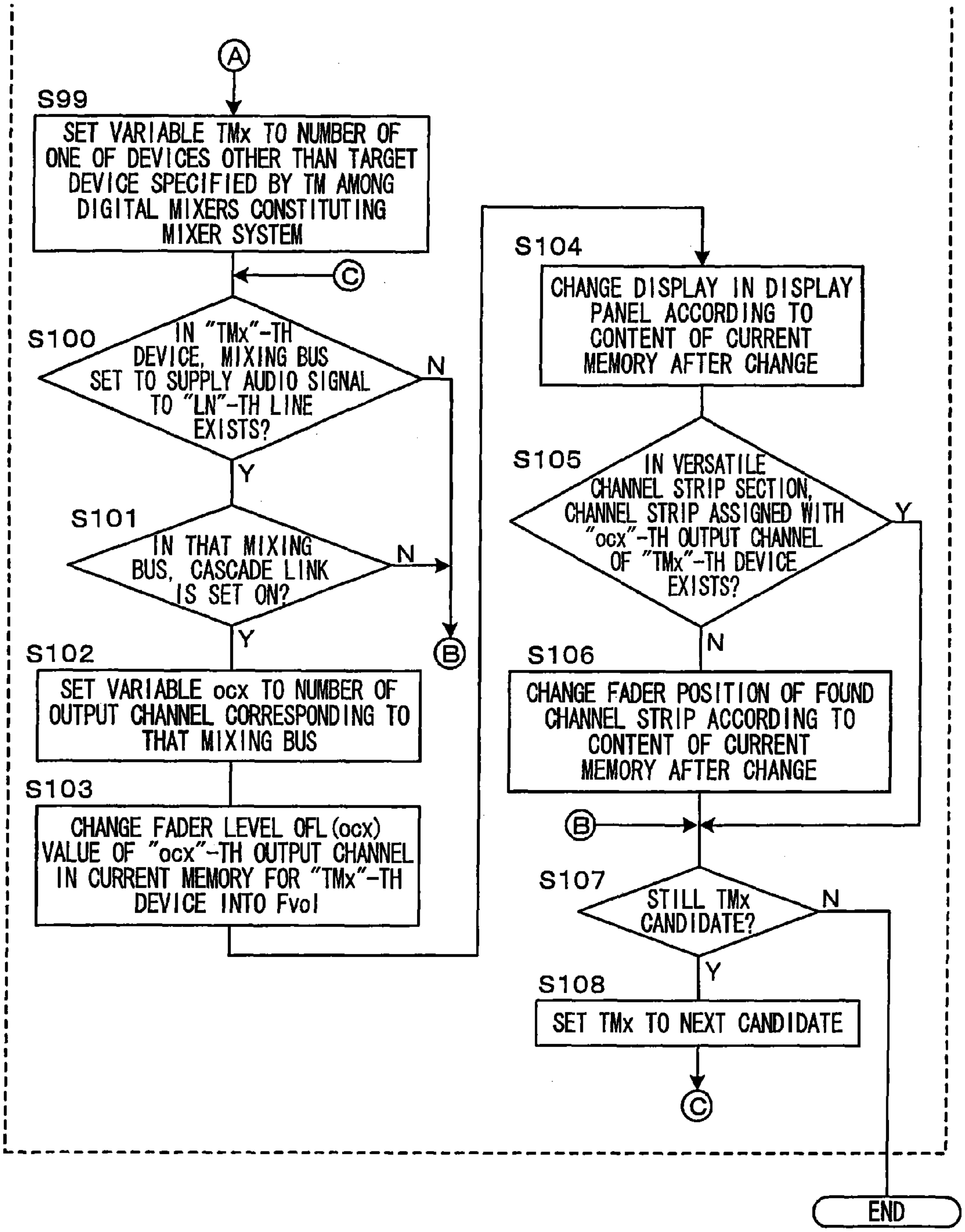
FIG. 19 is a flowchart subsequent to the flowchart of FIG. 18.

FIGS. 18 and 19 show flowcharts of processes executed by the CPU 11 of the digital mixer #1 when a fader of the output channel strip section 110 is operated.

When some fader (or control to which the fader parameter is assigned) of a channel strip of the output channel strip section 120 is operated, the CPU 11 of the digital mixer #1 starts the process shown in flowchart of FIG. 18.

The CPU 11 firstly refers to layer data corresponding to an "OL"-th output channel layer, which is currently selected, and sets variable oc in the layer to a number of the output channel assigned to the channel strip including the operated fader in the "OL"-th layer (S91).

Then, the CPU changes the fader level OFL(oc) of the "oc"-th output channel in the current memory for the "TM"-th device into a value Fvol, which is a decibel value calculated from the position of the operated fader (S92). Further, the CPU 11 changes the displays in the output channel strip section 120 and display panel 143 according to the content of the current memory after the change (S93).

When there is a channel strip assigned with the "oc"-th output channel of the "TM"-th in the versatile channel strip section 130 (S94), the CPU 11 changes the fader position of that channel strip according to the content of the current memory after the change (S95).

The above process has the same meaning as the processes in FIG. 15 although there is a difference between the input channels and output channels. The processes subsequent to step S96 are processes for realizing an output channel link function.

In this part of the process, regarding the cascade bus of the line for which the mixing bus corresponding to the "oc"-th output channel of the "TM"-th device is set to supply the audio signal, if the output channel link set in the screen of FIG. 8 is "ON" (S96), the CPU 11 sets the variable LN to the number of that line (S97). Then, regarding the mixing bus corresponding to the "oc"-th output channel of the "TM"-th device, if the cascade link set in the screen of FIG. 8 is "ON" (S98), the CPU 11 proceeds to the process in step S99 in FIG. 19 to reflect the change in the OFL(oc) in step S92 to the other output channels linked to the "oc"-th output channel.

On the other hand, if the result is "NO" in step S96, the CPU 11 finishes the process since the output channel link setting is OFF. Further, if the result is "NO" in step S98, it can be recognized that an audio signal, which is not cascade linked, are inputted to the output channel in which the fader level is currently changed. In this case, also, the process is finished since an output channel link is not required.

In the process shown in FIG. 19, the CPU 11 sets the variable TMx to a number of one of the devices other than the target device specified by TM among the digital mixers constituting the mixer system (S99). The TMx can be set to the number of any of the devices since the TMx will be subsequently set to the number of all devices other than the target device in the following step S108. For example, the CPU 11 sets the TMx to the smallest number among the candidates.

Then, concerning the "TMx"-th device, if there is a mixing bus which is set to supply the audio signal to the "LN"-th line set in step S97 (S100), and the cascade link setting of the mixing bus is "ON" (S101), the CPU 11 sets the variable ocx to a number of the output channel corresponding to that mixing bus (S102).

In this case, the "oc"-th output channel of the "TM"-th device and the "ocx"-th output channel of the "TMx"-th device are in relation that same audio signals are supplied the output channels from a common cascade bus. Accordingly, the CPU 11 changes the value of the OFL(ocx) to the Fvol, which is the same value as in the case of step S92 of FIG. 18, in the current memory for the "TMx"-th device, to reflect the change made in step S92 to the fader level OFL(ocx) of the "ocx"-th output channel of the "TMx"-th device and thereby maintain the values of the parameters constant in these channels (S103).

Then, the CPU 11 changes the displays and positions of controls similarly to steps S93 to S95 in FIG. 18 (S104 to S106). The CPU 11 sets the TMx to the next candidate if another candidate of TMx exists (S107, S108), and repeats the process from step S100. If the result is "NO" in step S107, the CPU 11 simply finishes the process.

Further, if the result is "NO" in step S100 or S101, there is no output channel to be linked in the "TMx"-th device, since the audio signal is not supplied to the output channel from the "LN"-th line of the cascade bus in the "TMx"-th device. Then, the CPU 11 immediately proceeds to step S107 and sets the TMx to the next candidate if another candidate of TMx exists.

According to the above process, it is possible to edit parameters of output channels corresponding to the selected output channel layer according to an operation on the fader of the output channel strip section 120. Thus, in the processes of steps S91, S92, the CPU 11 serves as a second parameter editor.

When a value of a parameter in an output channel in a digital mixer is changed, the same change is executed to the value of the parameter of the output channel in another digital mixer, to which the same audio signal from a common cascade bus is supplied as the above changed output channel, so that the consistency of values of parameters specifying the contents of signal processings can be maintained between those output channels. That is, the output channel link function described with reference to FIGS. 8 and 9 can be realized. The CPU 11 thus serves as a linking device in the processes of steps S96 to S103 for realizing the function.

When the content of the current memory is changed in the process of step S92 or S101, the CPU 11 of the corresponding digital mixer executes a process having the same purpose as the process in FIG. 16 to reflect a value of the fader level of the changed output channel to the signal processing in the DSP 16 taking setting contents of the DCA groups into account. This process is not shown.

Figure 20:
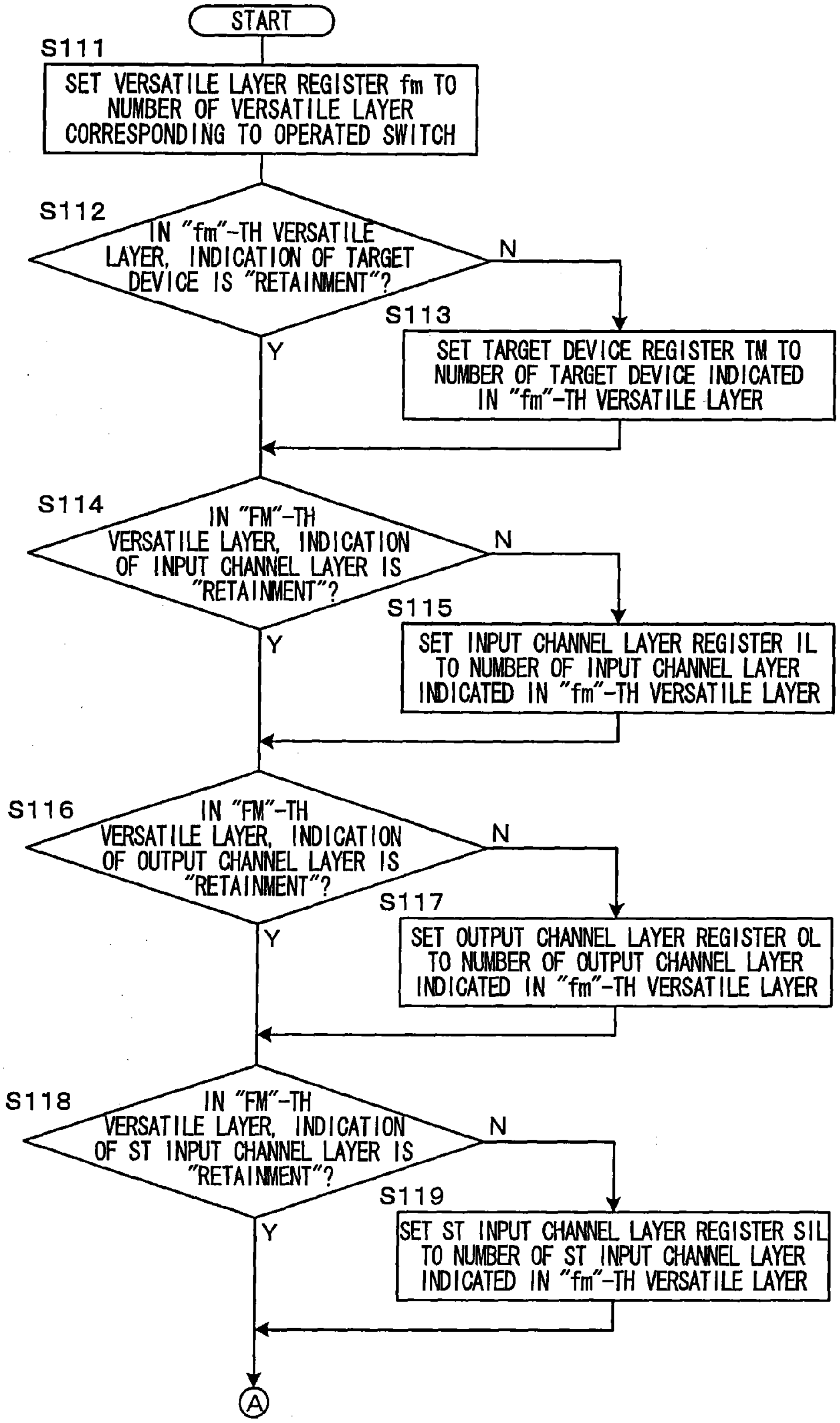
FIG. 20 is a flowchart of a process executed by the CPU of the digital mixer #1 shown in FIG. 1 when a layer selection switch for selecting a versatile layer is operated.
Figure 21:
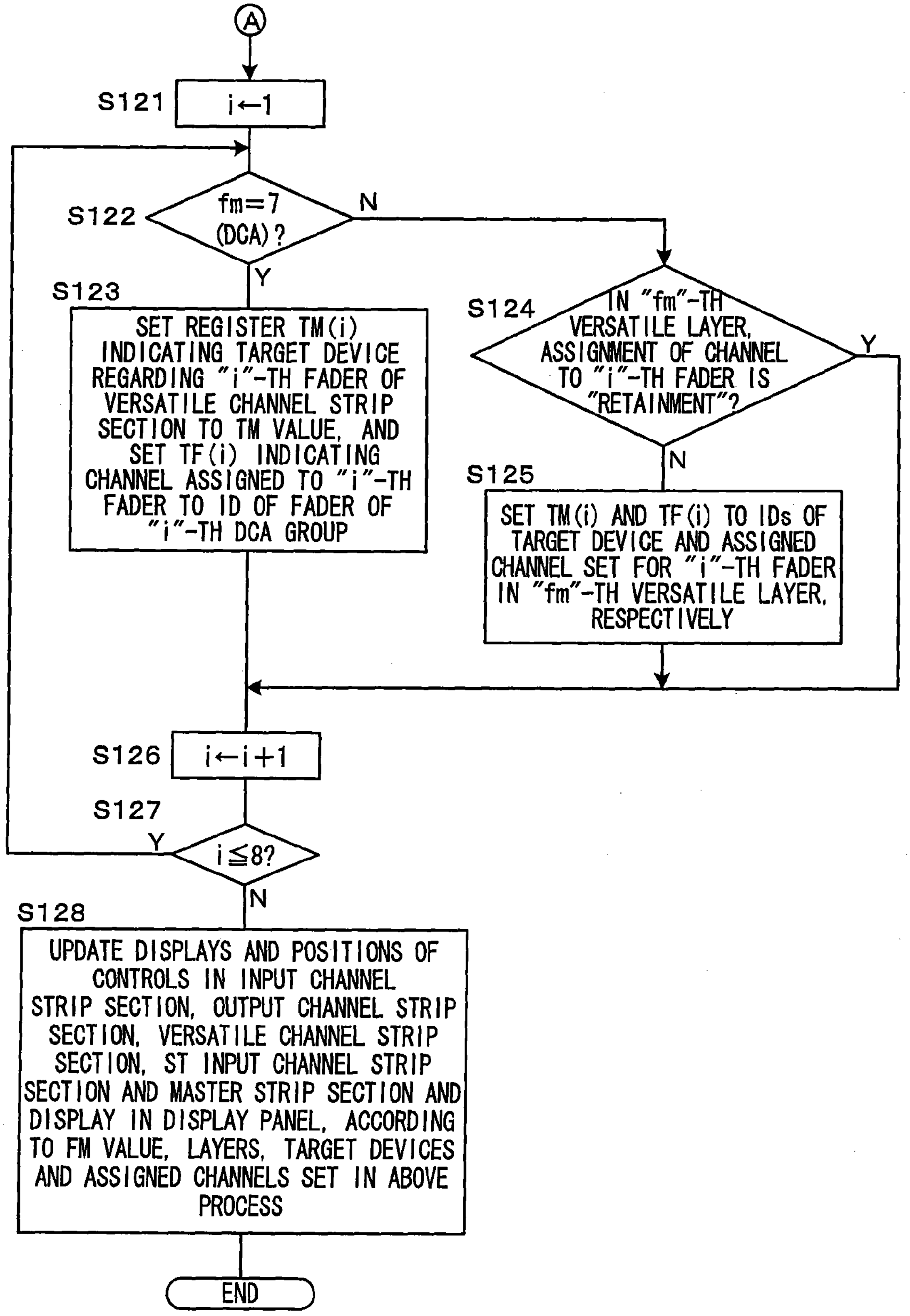
FIG. 21 is a flowchart subsequent to the flowchart of FIG. 20.

FIGS. 20 and 21 show flowcharts of a process executed by the CPU 11 of the digital mixer #1 when some of the layer selection switches 131 for selecting a versatile layer is operated.

When some of the layer selection switches 131 is operated, the CPU 11 of the digital mixer #1 starts a process shown in a flowchart of FIG. 20.

The CPU 11 sets the versatile layer register fm to a number of the versatile layer corresponding to the operated switch (S111). Then, the CPU 11 refers to layer data corresponding to the "fm"-th versatile layer set in the layer setting screen 200 shown in FIG. 7. If the indication of the target device is not "retainment" in the "fm"-th versatile layer (S112), the CPU 11 sets the target device register TM to the number of the target device indicated in the "fm"-th versatile layer (S113) to select the target device having the number. When the indication of the target device is "retainment" in step S112, the CPU 11 leaves the value of the target device register TM, that is, a selection content of the target device, unchanged.

The CPU 11 proceeds to the subsequent process in both cases. The CPU 11 sets values of input channel layer register IL, output channel layer register OL, and ST input channel layer register SIL to each items of the input channel layer, output channel layer and ST input channel layer according to the content indicated in the versatile layer data corresponding to the "fm"-th versatile layer if "retainment" is not indicated in the versatile layer. Further, if "retainment" is indicated, the item is not changed and selection of the layer is left unchanged (S114 to S119).

Then, the CPU 11 proceeds to the process in step S121 of FIG. 21, sets the variable i to "1" (S121), and determines whether the fm is equal to 7 (S122). When the fm is equal to 7, it means that the DCA layer is selected by the layer selection switch 131.

In the case that the fm is equal to 7, the CPU 11 sets the register TM(i) indicating the target device regarding the "i"-th fader of the versatile channel strip section 130, to a value of TM indicating a currently set target device, and sets the register TF(i) indicating a channel assigned to the "i"-th fader to the ID (identification data) indicating the fader of the "i"-th DCA group (S123).

On the other hand, if the fm is not 7, the CPU 11 refers to the layer data corresponding to the selected "fm"-th versatile layer, and determines whether or not the assignment of the channel to the "i"-th fader is "retainment" in the "fm"-th versatile layer (S124). If the assignment is not "retainment," the CPU 11 sets the register TM(i) indicating the target device operated by the "i"-th fader of the versatile channel strip section 130 and the register TF(i) indicating a channel assigned to the "i"-th fader respectively to the target device indicated for the "i"-th fader in the "fm"-th versatile layer and the ID of the assigned channel (S125). When the assignment is "hold status," the CPU 11 leaves the settings of the target device and the assigned channel in "i"-th fader unchanged.

The IDs used to set the register TF(i) in steps S123 and S125 are those which can uniquely distinguish all the elements which can be assigned to the channel strips of the versatile channel strip section 130 such as channels and DCA groups. It is preferable that the channels assigned to the channel strips are expressed by the IDs in the layer data. Further, an ID which expresses no-assignment is prepared, so that the ID expressing no-assignment is set to the TF(i) if it is set that no channels are to be assigned to the "i"-th fader in the versatile layer. The content of the TF(i) is an assignment information.

After steps S123 and S125, the i is incremented by one (S126), and when the i is 8 or less (S127), the CPU 11 repeats the process from step S122. According to the processes in steps S121 to S127, it is possible to set assignment of a target device and a channel for each of the eight channel strips in the versatile channel strip section 130, according to the layer data corresponding to the selected versatile layer.

If the result is "NO" in step S127, the CPU 11 updates the displays and positions of controls in the input channel strip section 110, output channel strip section 120, versatile channel strip section 130, ST input channel strip 147 and master strip section 149, and the display in the display panel 143 according to the value of Fm, the layers, target devices and assigned channels, which are set in the above processes (S128), and finishes the process.

According to the above process, it is possible to switch versatile layer, which is a first layer, in response to an operation on the layer selection switches 131. The CPU 11 serves as a second layer selector in this process. Further, the CPU 11 works as a mixer selector in step S113 for indicating a target device, and as a first layer selector in steps S115, S117, and S119 for selecting layers regarding other channel strip sections.

In this case, regarding the channel strip to which "retainment" is indicated in the layer data, the assignment of the channel can be left unchanged even when the versatile layer is switched. Further, it is possible not to assign any channel to the channel strip, to which "no-assignment" is indicated in the layer data. Thus, a high flexibility in channel assignment using layers is obtained.

Any channel of any device constituting the mixer system 1, not only the channels of the digital mixer #1 having the operation panel 100, can be assigned to the channel strips of the versatile channel strip section 130. Thus, high operability is obtained when parameters of plural mixers are edited at the same time.

It is possible to select a layer indicating a target device for the operation panel 100 or channels assigned to other channel strip sections while assigning channels to the channel strips of the versatile channel strip section 130. Needless to say, "retainment" can be set in these selection. Thus, high operability is obtained when channel assignment to controls of plural sections is executed at the same time, for example, when assigning channels, which have a close relation to the channels assigned to the versatile channel strip section 130, to the other channel strip sections.

Figure 22:
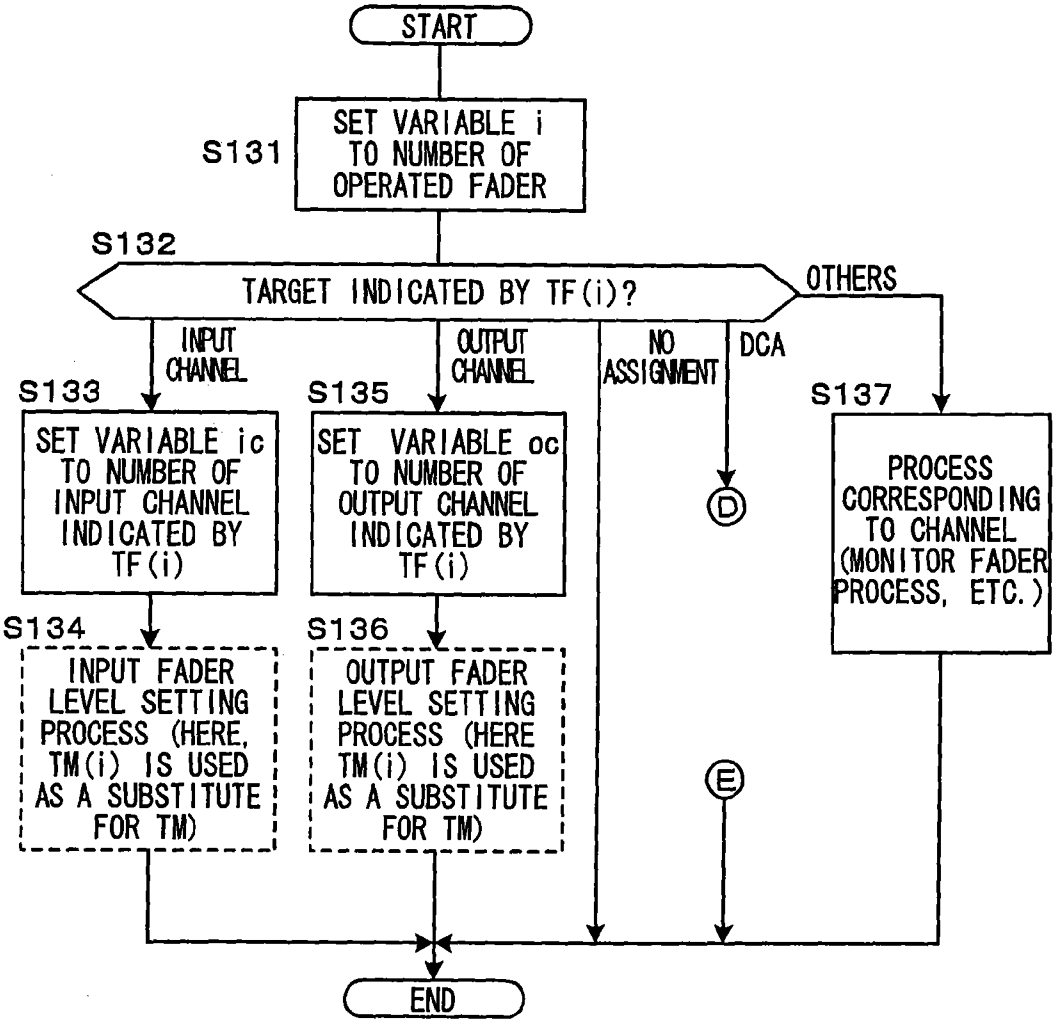
FIG. 22 is a flowchart of a process executed by the CPU of the digital mixer #1 shown in FIG. 1 when a fader of a versatile channel strip section is operated.
Figure 23:
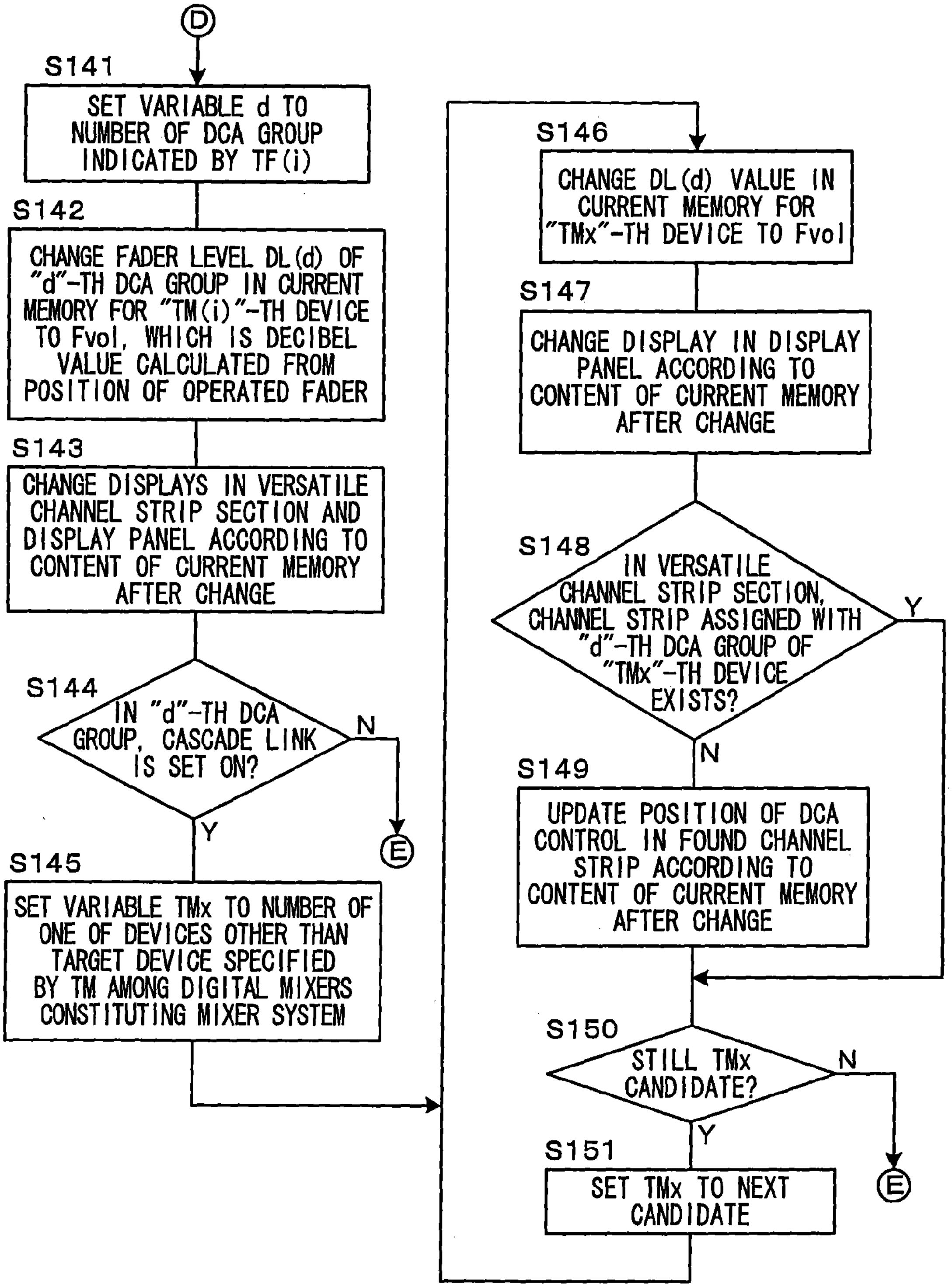
FIG. 23 is a flowchart subsequent to the flowchart of FIG. 22.

FIG. 22 and FIG. 23 show flowcharts of a process executed by the CPU 11 of the digital mixer #1 when the fader of the versatile channel strip section 130 is operated.

When some fader (or control assigned with a fader parameter) of a channel strip in the versatile channel strip section 130 is operated, the CPU 11 of the digital mixer #1 starts the process shown in the flowchart of FIG. 22.

The CPU 11 firstly sets the variable i to a number of the operated fader (S131). Then, the CPU 11 determines a target indicated by the TF(i), that is, the operation target for the operated fader (S132), and executes a process according to the type of the target.

When the target is an input channel, the CPU 11 sets the variable ic to a number of the input channel indicated by the TF(i) (S133), executes the input fader level setting process shown in steps S62 to S65 of FIG. 15 (S134), and finishes the process. According to this process, it is possible to change the fader level of the input channel assigned to the operated fader in response to the operation in the fader, and to update the display contents and positions of controls. Here, since the target device for the "i"-th fader is set in the register TM(i), a value of TM(i) is used, as a substitute for TM, in the input fader level setting process.

When the target is an output channel in step S132, the CPU 11 sets the variable oc to a number of the output channel indicated by the TF(i) (S135), execute the output fader level setting process shown in steps S92 to S108 in FIGS. 18 and 19 (S136), and finishes the process. According to this process, it is possible to change the fader levels of the output channel assigned to the operated fader and the output channels linked to that output channel, in response to the operation in the fader, and to update the display contents and positions of controls. Here, also in the output fader level setting process, a value of TM(i) is used as a substitute for the TM.

When the setting is "no-assignment" in step S132, the CPU 11 does not change the values of the parameters in response to the operation of the fader, and finishes the process.

When the target is a DCA group in step S132, the CPU 11 executes the process starting with step S141 in FIG. 23.

The CPU 11 sets the variable d to a number of the DCA group indicated by the TF(i) (S141). Then, the CPU 11 changes the fader level DL(d) of the "d"-th DCA group in the current memory for the "TM(i)"-th device to a Fvol, which is a decibel value calculated from the position of the operated fader (S142), and changes the displays in the versatile channel strip section 130 and display panel 143 according to the content of the current memory after the change (S143).

The CPU 11 determines whether the cascade link setting in the "d"-th DCA group is ON (S144). Regarding the mixer system 1, it has been already described that a DCA group is provided to the respective devices. The cascade link of the DCA groups is a function for setting the fader levels in the DCA groups having the same number of all the devices at a common value. The cascade link is a setting common to all devices and each of the DCA group can be independently set ON or OFF.

When the cascade link setting is not ON in step S144, the CPU 11 repeats the process from FIG. 22 since it is not required to change the parameter values in other items. On the other hand, when the cascade link setting is ON, the CPU 11 executes a process for setting DCA groups in other devices in step S145 and sequential processes.

This process is for sequentially selecting devices other than the device indicated by the TM(i) (S145, S150, S151) and setting a value of fader level DL(d) of the "d"-th DCA group in the current memory for the selected device to the same Fvol as that in step S142, in each device (S146). Further, the CPU 11 updates the display in the display panel (S147), and updates the position of the DCA control in the channel strip when the DCA group, in which fader level is changed, is assigned to the channel strip of the versatile channel strip section 130 (S148, S149).

When the processes for all devices are completed, the CPU 11 returns to step S150 to FIG. 22, and finishes the process.

When the target is other element in step S132 of FIG. 22, the CPU 11 executes a process according to the type of the element (S137), thereby changing the target fader level assigned to the operated fader, and updating the displays corresponding to the change, for example. The element in this case can be the ST input channel, ST output channel, monitor output channel and the like.

According to the above process, it is possible to edit the value of the target parameter assigned to the channel strip including the operated fader by the versatile layer, in response to the operation on the fader of the versatile channel strip section 130. In this process, the CPU 11 serves as a first parameter editor.

When the fader level of the DCA group is changed in step S142 or S146, the coefficients, which are reflected to the signal processing in the DSP 16, for all channels included in the DCA group should be also changed. Thus, in this case, the CPU 11 of each digital mixer, which changed the fader level of the DCA group, executes processes shown in FIG. 16 and the like for all channels included in the DCA group to reset coefficient to the DSP according to the value of the fader level after the change.

The above is the description of an embodiment; however, it should be noted that the embodiment should not be limited to the above described system configuration, device configuration, data configuration, concrete process contents and the like.

For example, the numbers, functions, and types of the channels or buses provided to each digital mixer are not limited to the above embodiment. The number and functions of the channel strips provided to the operational panel and the number of channel strips provided to each channel strip section are not limited to the above embodiment, either. Also, regarding the number of cascade buses, same number of the cascade buses as the number of the mixing buses are provided for each types of mixing buses in the above embodiment; however, it should not be limited to this and the number of the cascade buses can be greater or less than the number of the mixing buses.

Further, regarding the correspondence relation between the mixing buses and cascade buses, relations, which is fixedly determined in advance, can be employed, as a substitute for the relations determined by the user using the screen shown in FIG. 8 and the like.

The number of the input channels and output channels should not be always the same in all the respective digital mixers constituting the mixer system.

In case that the numbers of channels are different in one mixer and another mixer, it is considered that, when the target device is switched, a channel assigned to the channel strip does not exist in the mixer after the switching or a selected layer does not exist in the mixer after the switching. However, it cannot be a particular problem in a the operation if the CPU 11 does not change the values of the parameters in response to the operation in the control, similarly to the case of "no-assignment," regarding a channel strip to be assigned with a non existent channel and a channel strip section for which a nonexistent layer is to be selected. Further, as substitute for such nonexistent channels and layers, other channels or layers in the target device can be automatically selected or the selections of the channels and layers before switching can be retained.

Similar situation can occur when the second and third digital mixers corresponding to the device selection switches 144 are not cascaded to the digital mixer having the operation panel 100. However, in this case, regarding the control to be used to operate parameters of nonexistent mixer according to a selection of the target device, it is conceivable that values of parameters are not changed in response to operation of the control, or another mixer is selected as a target device as a substitute for the nonexistent device. Or, when a nonexistent device is selected, the editing target device can be retained without being switched.

In the above description of the embodiment, an expression of a number of channel is used; however, any ID, which can distinguish a particular channel and the like from other same type of elements, can be employed. Thus, when identification data including letters or symbols is employed as a substitute for the "number," processes having the same purpose as those in the above embodiment can be executed.

Further, regarding the output channel link function, the above embodiment shows an example that the output channel link setting ON/OFF is set in each line. However, it is conceivable that a set of plural lines are defined as a unit, the output channel link setting is made for each of the units, and all output channels, to which audio signals are supplied from the cascade buses in one of the lines belonging to one unit, is all linked. Such a function is effectively used when a couple of monaural buses are defined as a unit to process L signal and R signal of stereo sound The various functions described in the above embodiment can perform its particular effects when those functions are separately provided.

According to the above embodiment, a mixer system has three connected digital mixers; however, the number of the digital mixers to be connected is not limited to this example. Further, the digital mixers constituting the mixer system can include a plurality of digital mixers having operation panels. For example, it is conceivable that the digital mixer used to operate the mixer system includes a large operation panel with many controls and the other digital mixers include simple operation panels with scene recall controls and a few increase/reduce controls for setting values of parameters, which are used when the mixers are operated independently.

The above mixer system can be composed of audio signal processing devices having mixer's functions, such as a hard disk recorder, an electronic musical instrument, a karaoke machine, a tone generator, a MIDI (Musical Instruments Digital Interface) sequencer, and the like. Further, the connections between the mixers can be realized by network connection using Ethernet, IEEE (Institute of Electrical and Electronic Engineers) 1394, USB, and the like, other than the cascade connection.

The layer information is not required to be edited by using the digital mixer itself and can be edited by using a PC (personal computer), etc. and then set to the digital mixer.

As clearly seen in the above description, according to the digital mixer of the embodiment, in a digital mixer that processes audio signals in a plurality of channels, flexibility in channel assignment can be improved when channels are assigned to controls by using layers.

Therefore, a digital mixer with a high operability can be provided.

Further, according to the digital mixer of the embodiment, the operability of assigning operation when operating target is assigned to controls of plural sections for each of the sections can be improved.

Therefore, a digital mixer with a high operability can be provided also in this viewpoint.

Furthermore, according to the digital mixer of the embodiment, operability when parameter values in plural cascaded digital mixers are edited in use of a control provided to one of the digital mixers can be improved.

Therefore, a digital mixer with a high operability can be provided also in this viewpoint.

Furthermore, according to the digital mixer of the embodiment, it can be realized to obtain a mixer system composed of plural cascaded digital mixers, in which corresponding parameters of the respective digital mixers can be maintained to be same values even when the correspondence relation of mixing buses or output channels of the digital mixers is variable.

Therefore, a mixer system with a high convenience can be provided.

TABLE 1

| Name of register/parameter | Information to be set | Device independence |
|---|---|---|
| target device register TM | number of target device | NO |
| input channel layer register IL | number of selected input channel layer | NO |
| output channel layer register OL | number of selected output channel layer | NO |
| versatile layer register fm | number of selected versatile channel layer | NO |
| ST input channel layer register SIL | number of selected ST input channel layer | NO |
| IFL(ic) | fader level of "ic"-th input channel | YES |
| OFL(oc) | fader level of "oc"-th output channel | YES |
| TM(i) | ID of device operated by "i"-th channel strip in versatile channel strip section | NO |
| TF(i) | ID of channel, etc. operated by "i"-th channel strip in versatile channel strip section | NO |
| DL(d) | fader level of "d"-th DCA group | YES |

This application is based on, and claims priority to, Japanese Patent Application Nos. 2007-060956, filed on 9 Mar. 2007, 2007-060974 filed 9 Mar. 2007, 2007-060976 filed 9 Mar. 2007, and 2007-060985 filed 9 Mar. 9, 2007. The disclosures of the priority applications, in their entirety, including the drawings, claims, and the specifications thereof, are incorporated herein by reference.

What is claimed is:

1. A digital mixer that processes audio signals in a plurality of channels, comprising:

a first current memory that stores values of parameters of each of said channels for processing of audio signals in said channels by the digital mixer;

a first channel strip section including a plurality of first channel strips, on each of which a plurality of controls are disposed;

a first parameter editor that edits, in response to user operation of each of said controls on each of said first channel strips, a value of a parameter, corresponding to the operated control, among parameters of a channel assigned to the first channel strip having the operated control;

a first layer memory that stores first layer data for each of a plurality of first layers, respective first layer data indicating, for each of said first channel strips, any of (a) one channel to be assigned to the first channel strip among said plurality of channels, and (b) retainment of channel assignment to the first channel strip, at least one of the respective first layer data indicating said retainment for at least one of the first channel strips; and a first assigning device that, in response to a user selection of one of said plurality of first layers, selects first layer data corresponding to the selected first layer, for each of said first channel strips, if the selected first layer data indicate a channel, assigns the channel indicated by the selected first layer data to the first channel strip, and, if the selected first layer data indicate said retainment, leaves the assignment of a channel to the first channel strip unchanged, wherein the selected first layer data indicates retainment for each of the first channel strips in a first subset of the first channel strips and indicates respective channels for each of the first channel strips in a second subset of the first channel strips, and, consequently, the first assigning device leaves unchanged channel assignments for each of the first channel strips in the first subset of the first channel strips and assigns the respective channels for each of the first channel strips in the second subset of the first channel strips.

2. A digital mixer according to claim 1, wherein said respective first layer data indicate, for each of said first channel strips, any of (a) one channel among said plurality of channels, (b) retainment of channel assignment to the first channel strip, and (c) no-assignment of channel to the first channel strip, said first assigning device, for each of said first channel strips, if the selected first layer data indicate no-assignment, changes the first channel strip into a non-assigned state in which no channels are assigned to the first channel strip, and said first parameter editor does not perform the edit of the value of the parameter in response to the operation of said controls, if the channel assigned to the first channel strip having the operated control is in the non-assigned state.

3. A digital mixer that processes audio signals in a plurality of channels based on values of parameters of each of said channels stored in a first current memory, comprising:

a first channel strip section including a plurality of first channel strips, on each of which a plurality of controls are disposed;

a first parameter editor that edits, in response to user operation of each of said controls on each of said first channel strips, a value of a parameter, corresponding to the operated control, among parameters of a channel assigned to the first channel strip having the operated control;

a first layer memory that stores first layer data for each of a plurality of first layers, respective first layer data indicating, for each of said first channel strips, any of (a) one channel to be assigned to the first channel strip among said plurality of channels, and (b) retainment of channel assignment to the first channel strip;

a first assigning device that, in response to a user selection of one of said plurality of first layers, selects first layer data corresponding to the selected first layer, for each of said first channel strips, if the selected first layer data indicate a channel, assigns the channel indicated by the selected first layer data to the first channel strip, and, if the selected first layer data indicate said retainment, leaves the assignment of a channel to the first channel strip unchanged;

a second channel strip section including a plurality of second channel strips, on each of which a plurality of controls are disposed;

a second layer memory that stores second layer data for each of a plurality of second layers, respective second layer data indicating, for each of said second channel strips, one channel to be assigned to the second channel strip among said plurality of channels;

a second assigning device that, in response to a user selection of one of said plurality of second layers, selects second layer data corresponding to the selected second layer, and assigns the channel indicated by the selected second layer data to each of said second channel strips; and a second parameter editor that edits, in response to user operation of each of said controls on each of said second channel strips, a value of a parameter, corresponding to the operated control, among parameters of a channel assigned to the second channel strip having the operated control, wherein said respective first layer data include first link data that indicate one of said plurality of said second layers, and said first assigning device controls, when selecting said first layer data in response to the user selection of said one first layer, said second assigning device to select the second layer data corresponding to the second layer indicated by said first link data included in said selected first layer data.

4. A digital mixer according to claim 3, wherein said first link data included in said respective first layer data indicate any of (a) one of said plurality of second layers, and (b) retainment of selection of the second layer, and said first assigning device does not control, even when selecting said first layer data in response to the user selection of said one first layer, said second assigning device to select the second layer data, if said first link data included in said selected first layer data indicate said retainment.

5. A digital mixer according to claim 3, further comprising:

a cascade interface for cascading another digital mixer that processes audio signals in a plurality of channels; and a mixer selector that selects a target mixer in which parameters are to be edited according to operation of the controls of said second channel strips, among the digital mixer and a cascaded mixer which is cascaded to said cascade interface, wherein said second parameter editor edits, in response to user operation of each of said controls on each of said second channel strips, a value of a parameter, corresponding to the operated control, among parameters of a channel assigned to the second channel strip having the operated control by said second assigning device according to the second layer data, in the target mixer selected by said mixer selector, wherein said respective first layer data include second link data that indicate the target mixer to be selected by said mixer selector, and wherein said first assigning device controls, when selecting said first layer data in response to the user selection of said one first layer, said mixer selector to select the target mixer indicated by the second link data included in said selected first layer data.

6. A digital mixer that processes audio signals in a plurality of channels based on values of parameters of each of said channels stored in a first current memory, comprising a first channel strip section including a plurality of first channel strips, on each of which a plurality of controls are disposed;

a first parameter editor that edits, in response to user operation of each of said controls on each of said first channel strips, a value of a parameter, corresponding to the operated control, among parameters of a channel assigned to the first channel strip having the operated control;

a first layer memory that stores first layer data for each of a plurality of first layers, respective first layer data indicating, for each of said first channel strips, any of (a) one channel to be assigned to the first channel strip among said plurality of channels, and (b) retainment of channel assignment to the first channel strip;

a first assigning device that, in response to a user selection of one of said plurality of first layers, selects first layer data corresponding to the selected first layer, for each of said first channel strips, if the selected first layer data indicate a channel, assigns the channel indicated by the selected first layer data to the first channel strip, and, if the selected first layer data indicate said retainment, leaves the assignment of a channel to the first channel strip unchanged; and a cascade interface for cascading another digital mixer that processes audio signals in a plurality of channels based on values of parameters of each of said channels stored in a second current memory provided in said another mixer, wherein said respective first layer data indicate, for each of said first channel strips, any of (a) one channel to be assigned to the first channel strip among said plurality of channels in the digital mixer, (b) retainment of channel assignment to the first channel strip, and (c) one channel to be assigned to the first channel strip among said plurality of channels in a cascaded mixer which is cascaded to said cascade interface, wherein said first assigning device, when selecting said first layer data, for each of said first channel strips, if the selected first layer data indicate a channel in the digital mixer or a channel in said cascaded mixer, assigns the channel indicated by the selected first layer data to the first channel strip, and, if the selected first layer data indicate said retaiment, leaves the assignment of a channel to the first channel strip unchanged, and wherein said first parameter editor, in response to user operation of each of said controls on each of said first channel strips, edits a value of a parameter stored in said first current memory, corresponding to the operated control, among parameters of a channel assigned to the first channel strip having the operated control, if any of the channels in the digital mixer is assigned to the first channel strip, and requests said cascaded mixer to edit a value of a parameter stored in said second current memory, corresponding to the operated control, among parameters of a channel assigned to the first channel strip having the operated control, if any of the channels in the cascaded mixer is assigned to the first channel strip.

7. A digital mixer that processes audio signals in a plurality of channels based on values of parameters of each of said channels stored in a first current memory, comprising:

a first channel strip section including a plurality of first channel strips, on each of which a plurality of controls are disposed;

a first parameter editor that edits, in response to user operation of each of said controls on each of said first channel strips, a value of a parameter, corresponding to the operated control, among parameters of a channel assigned to the first channel strip having the operated control;

a first layer memory that stores first layer data for each of a plurality of first layers, respective first layer data indicating, for each of said first channel strips, any of (a) one channel to be assigned to the first channel strip among said plurality of channels, and (b) retainment of channel assignment to the first channel strip;

a first assigning device that, in response to a user selection of one of said plurality of first layers, selects first layer data corresponding to the selected first layer, for each of said first channel strips, if the selected first layer data indicate a channel, assigns the channel indicated by the selected first layer data to the first channel strip, and, if the selected first layer data indicate said retainment, leaves the assignment of a channel to the first channel strip unchanged;

a cascade interface for cascading another digital mixer that processes audio signals in a plurality of channels based on values of parameters of each of said channels stored in a second current memory provided in said another mixer;

a third current memory which corresponds to the second current memory provided in a cascaded mixer which is cascaded to said cascade interface; and a synchronizing device that synchronizes data stored in said second current memory with data stored in said third current memory, wherein said respective first layer data indicate, for each of said first channel strips, any of (a) one channel to be assigned to the first channel strip among said plurality of channels in the digital mixer, (b) retainment of channel assignment to the first channel strip, and (c) one channel to be assigned to the first channel strip among said plurality of channels in a cascaded mixer which is cascaded to said cascade interface, wherein said first assigning device, when selecting said first layer data, for each of said first channel strips, if the selected first layer data indicate a channel in the digital mixer or a channel in said cascaded mixer, assigns the channel indicated by the selected first layer data to the first channel strip, and, if the selected first layer data indicate said retaiment, leaves the assignment of a channel to the first channel strip unchanged, wherein said first parameter editor, in response to user operation of each of said controls on each of said first channel strips, edits a value of a parameter stored in said first current memory, corresponding to the operated control, among parameters of a channel assigned to the first channel strip having the operated control, if any of the channels in the digital mixer is assigned to the first channel strip, and edits a value of a parameter stored in said third current memory, corresponding to the operated control, among parameters of a channel assigned to the first channel strip having the operated control, if any of the channels in the cascaded mixer is assigned to the first channel strip, and wherein said synchronizing device requests, when the value of the parameter stored in said third current memory is edited, said cascaded mixer to reflect the edited value to a value of the parameter stored in said second current memory.

8. A digital mixer according to claim 6, further comprising:

a plurality of first busses each of which mixes audio signals processed in said channels;

a correspondence setting device that sets one by one correspondence relation between said plurality of first busses and a plurality of lines which are provided for signal transmission between the digital mixer and said cascaded mixer;

a cascade mixing device that receives, via said plurality of lines, audio signals mixed in a plurality of second busses provided in said cascaded mixer, and mixes the audio signal received via each of said plurality of lines with the audio signal in the first bus which is corresponded to the line; and a cascade output device that supplies the audio signal of each of said plurality of lines mixed by said cascade mixing device for one of a plurality of output channels which is corresponded to the line, wherein the digital mixer processes audio signals in said plurality of output channels based on values of parameters of each of said output channels stored in said first current memory.

9. A digital mixer according to claim 8, further comprising:

a link setting device that sets link ON/OFF for each of said plurality of lines; and a linking device that synchronizes values of the parameters among the output channels for which the audio signals are supplied from a common line, for each of the plurality of lines for which the link ON is set.

10. A digital mixer according to claim 9, wherein said link ON can be collectively set for two or more lines, and said lining device synchronizes values of the parameters among the output channels for which the audio signals are supplied from any of the lines for which said link ON is collectively set.

11. A digital mixer according to claim 8, wherein whether the audio signal in said first bus is to be provided for the mixing in said cascade mixing or not can be set for each of said plurality of the first busses, and said cascade output device does not supply the audio signals mixed by said cascade mixing device for the output channel which is corresponded to the first bus for which said not to be supplied is set.

12. A digital mixer according to claim 1, wherein the first layer memory is part of the first current memory, and, wherein the digital mixer further comprises:

a scene memory, wherein the values of parameters of each of said channels and the first layer data for each of the plurality of first layers are stored together as part of a scene in the scene memory and are recalled from the scene memory to the first current memory in response to a user selection of the scene prior to the user selection of one of said plurality of first layers.

13. A digital mixer that processes audio signals in a plurality of channels, comprising:

a first current memory that stores values of parameters of each of said channels for processing of audio signals in said channels by the digital mixer;

a first channel strip section including a plurality of first channel strips, on each of which a plurality of controls are disposed;

a first parameter editor that edits, in response to user operation of each of said controls on each of said first channel strips, a value of a parameter, corresponding to the operated control, among parameters of a channel assigned to the first channel strip having the operated control;

a first layer memory that stores first layer data for each of a plurality of first layers, respective first layer data indicating, for each of said first channel strips, any of (a) one channel to be assigned to the first channel strip among said plurality of channels, and (b) retainment of channel assignment to the first channel strip;

a layer-setting section that provides controls that provide (a) and (b) as user-definable options for each of said first channel strips in order to define the respective first layer data according to user instructions; and a first assigning device that, in response to a user selection of one of said plurality of first layers, selects first layer data corresponding to the selected first layer, for each of said first channel strips, if the selected first layer data indicate a channel, assigns the channel indicated by the selected first layer data to the first channel strip, and, if the selected first layer data indicate said retainment, leaves the assignment of a channel to the first channel strip unchanged.

* * * * *